(12) United States Patent
Takemasu et al.

(10) Patent No.: US 11,773,249 B2
(45) Date of Patent: Oct. 3, 2023

(54) POLYORGANOSILOXANE-CONTAINING GRAFT COPOLYMER, THERMOPLASTIC RESIN COMPOSITION, AND MOLDED ARTICLE

(71) Applicant: Mitsubishi Chemical Corporation, Tokyo (JP)

(72) Inventors: Kenta Takemasu, Tokyo (JP); Ayaka Wakita, Tokyo (JP); Shinji Matsuoka, Tokyo (JP); Mitsufumi Nodono, Tokyo (JP); Naotaka Suenaga, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 262 days.

(21) Appl. No.: 17/102,517

(22) Filed: Nov. 24, 2020

(65) Prior Publication Data

US 2021/0102060 A1 Apr. 8, 2021

Related U.S. Application Data

(60) Division of application No. 16/704,588, filed on Dec. 5, 2019, now Pat. No. 11,161,974, which is a (Continued)

(30) Foreign Application Priority Data

Jun. 6, 2017 (JP) .................................. 2017-111777

(51) Int. Cl.
*C08L 51/00* (2006.01)
*C08L 51/08* (2006.01)
*C08L 69/00* (2006.01)

(52) U.S. Cl.
CPC ............. *C08L 51/085* (2013.01); *C08L 69/00* (2013.01)

(58) Field of Classification Search
None
See application file for complete search history.

(56) References Cited

U.S. PATENT DOCUMENTS 7,956,105 B2 6/2011 Lee et al.
9,527,997 B2 12/2016 Wakita et al.
(Continued)

FOREIGN PATENT DOCUMENTS

CN 104755516 A 7/2015
EP 3015484 A1 5/2016
(Continued)

OTHER PUBLICATIONS

International Search Report issued in related International Patent Application No. PCT/JP2018/020504 dated Sep. 4, 2018.
(Continued)

*Primary Examiner* — Robert S Loewe
(74) *Attorney, Agent, or Firm* — Morgan, Lewis & Bockius LLP

(57) ABSTRACT

Provided is a thermoplastic resin composition and a molded article excellent in balance of color developability and low-temperature impact resistance, where a polyorganosiloxane-containing graft copolymer in which a rubber (A) containing a polyorganosiloxane (A1) and a vinyl polymer (A2) is grafted with a vinyl monomer (b), wherein the vinyl polymer (A2) includes 90 to 100% by mass of a monofunctional vinyl monomer (a1) and 10 to 0% by mass of a polyfunctional vinyl monomer (a2) with respect to 100% by mass of the vinyl polymer (A2), wherein the glass transition temperature of the homopolymer of the monofunctional vinyl monomer (a1) is 0° C. or higher, and the peak of tan δ of the polyorganosiloxane-containing graft copolymer is in the range of −125° C. to −90° C.

9 Claims, 2 Drawing Sheets

Related U.S. Application Data continuation of application No. PCT/JP2018/020504, filed on May 29, 2018.

(56) References Cited

U.S. PATENT DOCUMENTS

2016/0137836 A1* 5/2016 Wakita .................. C08F 285/00
525/451
2017/0014316 A1   1/2017 D'Ambrogio et al.

FOREIGN PATENT DOCUMENTS

| | | |
|---|---|---|
| EP | 3085715 A1 | 10/2016 |
| JP | H10-176017 A | 6/1998 |
| JP | 2002-020443 A | 1/2002 |
| JP | 2012-057177 A | 3/2012 |
| JP | 2016-117866 A | 6/2016 |
| JP | 2016-117867 A | 6/2016 |
| TW | 201512250 A | 4/2015 |
| WO | 2014/208716 A1 | 12/2014 |

OTHER PUBLICATIONS

Extended European Search Report issued in counterpart European Patent Application No. 18813303.7 dated Aug. 12, 2020.
Office Action issued in counterpart Chinese Patent Application No. 201880037346.5 dated Oct. 20, 2021.
Songzhen et al., "Electrical Insulating Material Science and Engineering," Xi'an Jiaotong University Press, pp. 208-209 (1996).
Office Action issued in counterpart Japanese Patent Application No. 2021-018301 dated Feb. 1, 2022.
Office Action issued in counterpart Taiwanese Patent Application No. 107119088 dated Mar. 8, 2022.
Office Action dated Feb. 28, 2023, issued in corresponding Japanese Patent Application No. 2022-059192.
Extended European Search Report dated Mar. 14, 2023, issued in corresponding European Patent Application No. 22198233.3.

* cited by examiner

POLYORGANOSILOXANE-CONTAINING GRAFT COPOLYMER, THERMOPLASTIC RESIN COMPOSITION, AND MOLDED ARTICLE

TECHNICAL FIELD

The present invention relates to a polyorganosiloxane-containing graft copolymer that can be added to a thermoplastic resin to improve the low-temperature impact resistance of the thermoplastic resin composition. The present invention also relates to a thermoplastic resin composition containing the polyorganosiloxane-containing graft copolymer. The present invention further relates to a molded article of the thermoplastic resin composition.

BACKGROUND ART

Thermoplastic resins such as aromatic polycarbonate resins are excellent in transparency, impact resistance, heat resistance, dimensional stability, and the like as general-purpose engineering plastics, and are widely used industrially as materials in the automotive field, the OA equipment field, the electric and electronic fields, and the like because of their excellent characteristics. In order to improve the impact resistance of a thermoplastic resin, a method of adding an impact strength modifier therein is used.

In recent years, molded products obtained from thermoplastic resins have been mainly used for electrical and electronic device housings, household electric appliances, and the like, and are sometimes used without applying paint for the purpose of reducing the cost of the products, so that the resin itself is required to be colored to a desired color tone.

However, when the impact strength modifier is added, a thermoplastic resin composition having sufficient color developability may not be obtained in some cases. Therefore, Patent Document 1 proposes to use a polyorganosiloxane-containing graft copolymer obtained by polymerizing a vinyl monomer (b) in the presence of a rubber (A) containing polyorganosiloxane (A1) and a vinyl polymer (A2), wherein the rubber (A) has a refractive index in the range of 1.47 to 1.56, and a volume average particle size of the rubber (A) is in the range of 300 to 2000 nm, as an impact strength modifier. The polyorganosiloxane-containing graft copolymer described in Patent Document 1 can be blended into a thermoplastic resin to provide a thermoplastic resin composition having higher pigmentation ability, low-temperature impact resistance, and flame retardancy.

PRIOR ART LITERATURE

Patent Document

Patent Document 1: International Publication No. WO 2014/208716A1

SUMMARY OF THE INVENTION

Problems to be Solved by the Invention

However, even in the graft copolymer in Patent Document 1, there are cases balance between color developability and low-temperature impact resistance when the graft copolymer is added to the thermoplastic resin is not sufficient. In addition, the color tone of the molded article of the thermoplastic resin may be changed by exposure to severe conditions such as exposure outdoors to sunlight, weather, or the like, or exposure to heat generated by the apparatus, and further improvement is required.

It is an object of the present invention to provide an impact strength modifier capable of providing a thermoplastic resin composition and a molded article having a small change in color tone when exposed to severe conditions and excellent balance between color developability and low-temperature impact resistance.

Means for Solving the Problems

The present invention has the following aspects:
[1] A polyorganosiloxane-containing graft copolymer in which a rubber (A) containing a polyorganosiloxane (A1) and a vinyl polymer (A2) is grafted with a vinyl monomer (b), wherein the vinyl polymer (A2) includes 90 to 100% by mass of a monofunctional vinyl monomer (a1) and 10 to 0% by mass of a polyfunctional vinyl monomer (a2) with respect to 100% by mass of the vinyl polymer (A2), wherein the glass transition temperature of the homopolymer of the monofunctional vinyl monomer (a1) is 0° C. or higher, and the peak of tan δ of the polyorganosiloxane-containing graft copolymer is in the range of −125° C. to −90° C. as measured under [Measurement Condition 1] below:

[Measurement Condition 1]

A test piece is formed by compression-molding the polyorganosiloxane-containing graft copolymer at 160° C. and 5 MPa to a thickness of 1 mm, the test piece is set in a dynamic viscoelastic device, and the tan δ is measured at a heating rate of 2° C./min and a frequency of 10 Hz using the tensile mode at temperatures ranging from −150° C. to 180° C.

[2] The polyorganosiloxane-containing graft copolymer according to [1], wherein the refractive index thereof measured under [Measurement Condition 2] is in the range of 1.531 to 1.700:

[Measurement Condition 2]

The refractive index is measured by using the thinned polyorganosiloxane-containing graft copolymer by compression-molding, using an Abbe refractometer at a temperature 23° C. in accordance with JIS K 7142-A method.

[3] The polyorganosiloxane-containing graft copolymer according to [1] or [2], which further has another peak of tan δ at a temperature range of −80° C. to 0° C.

[4] The polyorganosiloxane-containing graft copolymer according to any one of [1] to [3], wherein the content of the polyorganosiloxane in terms of 100% by mass of the polyorganosiloxane-containing graft copolymer is 0.1 to 40% by mass. [5] A polyorganosiloxane-containing graft copolymer in which a rubber (A) containing 0.1 to 40% by mass of a polyorganosiloxane (A1) and 41 to 99.8% by mass of a vinyl polymer (A2) is grafted with 0.1 to 19% by mass of vinyl monomer (b) with respect to 100% by mass of the polyorganosiloxane-containing graft copolymer, wherein the vinyl polymer (A2) is a vinyl polymer of 90 to 100% by mass of a monofunctional vinyl monomer (a1) with 10 to 0% by mass of a polyfunctional vinyl monomer (a2), and wherein the monofunctional vinyl monomer (a1) has a glass transition temperature of 0° C. or more.

[6] The polyorganosiloxane-containing graft copolymer according to [5], wherein the refractive index measured under the [Measurement Condition 2] is in the range of 1.531 to 1.700.

[7] A thermoplastic resin composition comprising a polyorganosiloxane-containing graft copolymer according to any one of [1] to [6] and a thermoplastic resin.

[8] The thermoplastic resin composition according to [7], wherein the content of the polyorganosiloxane-containing graft copolymer in the total 100% by mass of the thermoplastic resin and the polyorganosiloxane-containing graft copolymer is 0.5 to 50% by mass.

[9] The thermoplastic resin composition according to [7] or [8], wherein the thermoplastic resin is a polycarbonate resin.

[10] A molded article formed by molding the thermoplastic resin composition according to any one of items [7] to [9].

[11] A graft copolymer having a dispersed phase (A phase) and a continuous phase (B phase) wherein, in an elastic modulus image measured in [Measurement Condition 3], an elastic modulus in the A phase is 0.4 GPa or more, and an elastic modulus in the B phase is 0.2 GPa or less, and wherein an average diameter of the A phase measured in [Measurement Condition 4] is 50 nm or more.

[Measurement Condition 3]

The particles of the graft copolymer are taken up in a capsule, the room temperature curing epoxy resin is poured, the capsule is left to cure for 12 hours at 25° C., and the obtained resin pieces are used as Sample 1 by ultramicrotome (trade name "Leica EM UC7", manufactured by Leica Microsystems Co., Ltd.) and exposed at room temperature using a glass knife. Sample 1 is subjected to scanning probe microscopy (manufactured by Veeco Instruments, Inc.) to acquire an elastic modulus image of the particles in a scanning area of 1 μm square.

In the elastic modulus image of the particle, a histogram of the elastic modulus of a rectangular region inscribed in the particle is obtained, the peak top of the Gaussian curve of the histogram is defined as the elastic modulus of the phase B. A histogram of the elastic modulus is also obtained in a region having a size of 50 nm square or more included in a region having an elastic modulus of 0.20 GPa or more in the particle, and the peak top of the Gaussian curve of the histogram is defined as the elastic modulus of the phase A.

[Measurement Condition 4]

The resin piece obtained by the Measurement Condition 3 is exposed and trimmed by the above ultramicrotome using a diamond knife at room temperature, and a slice is cut out under the condition of a thickness of 50 nm, and collected on a grid with a support film to use sample 2. Sample 2 is placed on a transmission electron microscope (trade name: "H-7600", Hitachi Co., Ltd.), to obtain a particle image at an acceleration voltage of 80 kV, a magnification of 200,000×. The obtained particle images are subjected to flatten the background brightness unevenness, remove noises, enhance edges, and binarize using image analysis software (trade name "Image-Pro® Plus", Nippon Roper K. K.). In the obtained particle image, a phase that appeared to be bright contrast is extracted by binarization, and 10 points are selected in order from the phases with the largest diameter that can be visually recognized in one particle image, and the average diameter thereof is obtained. Further, an average value is obtained for the average diameters of 10 particles, and the average value is defined as the average diameter of the A phase.

[12] The graft copolymer according to [11], wherein two or more of the A phase are included in one particle of the graft copolymer.

[13] The graft copolymer according to [11] or [12], wherein the average diameter of the A phase is 60 nm or more.

[14] The graft copolymer according to any one of [11] to [13], wherein the A phase is a phase containing an aromatic vinyl polymer.

[15] The graft copolymer according to any one of [11] to [14], wherein the B phase is a phase containing polyorganosiloxane.

[16] The graft copolymer according to any one of [11] to [15], wherein the graft copolymer has a weight average particle diameter of 300 to 2000 nm.

[17] A thermoplastic resin composition comprising the graft copolymer according to any one of [11] to [16] and a thermoplastic resin.

[18] The thermoplastic resin composition according to [17], wherein the content of the graft copolymer in a total of 100% by mass of the thermoplastic resin and the graft copolymer is 0.5 to 50% by mass.

[19] The thermoplastic resin composition according to [17] or [18], wherein the thermoplastic resin is a polycarbonate resin.

[20] A molded article obtained by molding the thermoplastic resin composition according to any one of [17] to [19].

Effect of the Invention

According to the present invention, it is possible to provide a graft copolymer which becomes an impact strength modifier capable of providing a thermoplastic resin composition and a molded article having little change in color tone when exposed to severe conditions and excellent balance between color developability and low-temperature impact resistance. According to the present invention, it is possible to provide a thermoplastic resin composition and molded article having such performance.

DESCRIPTION OF THE INVENTION

Figure 1A:
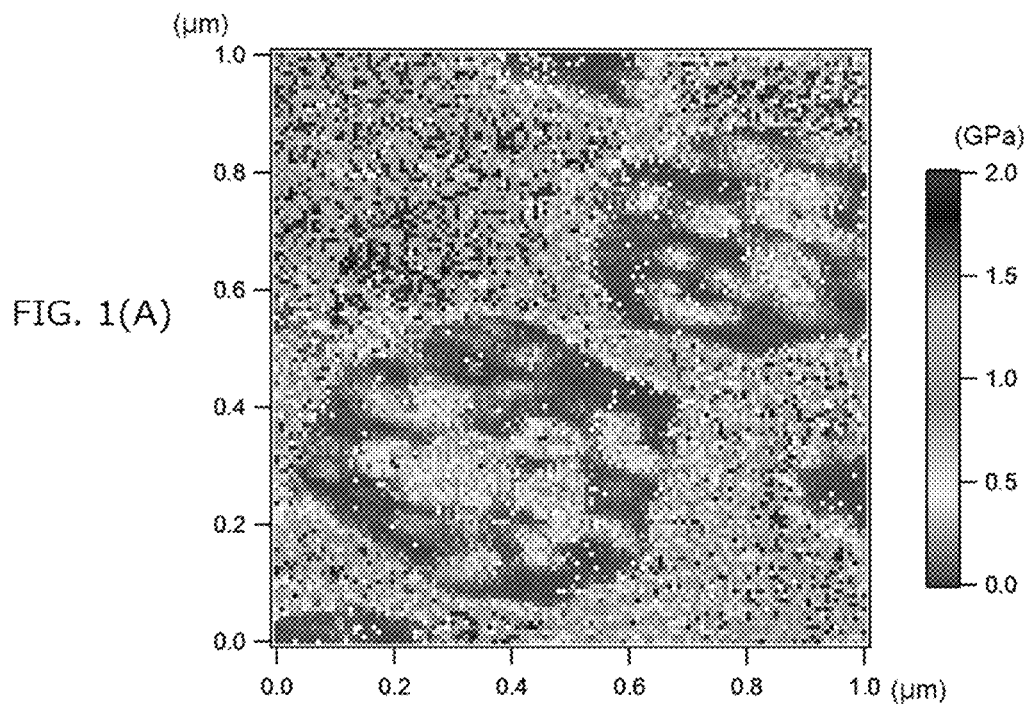
FIG. 1 (A) is an example of the elastic modulus image by the resulting scanning probe microscope in the Measurement Condition 3 and FIG. 1 (B) is its schematic diagram.

The present invention will be described in detail. In the present invention, "(meth) acrylate" means at least one of "acrylate" and "methacrylate".

<Polyorganosiloxane-Containing Graft Copolymer>

The polyorganosiloxane-containing graft copolymer according to the first embodiment of the present invention (sometimes simply referred to as "graft copolymer") is a polyorganosiloxane-containing graft copolymer in which a rubber (A) containing a polyorganosiloxane (A1) and a vinyl polymer (A2) is grafted with a vinyl monomer (b), wherein the vinyl polymer (A2) includes 90 to 100% by mass of a monofunctional vinyl monomer (a1) and 10 to 0% by mass of a polyfunctional vinyl monomer (a2) with respect to 100% by mass of the vinyl polymer (A2), wherein the glass transition temperature of the homopolymer of the monofunctional vinyl monomer (a1) is 0° C. or higher, and the peak of tan δ of the polyorganosiloxane-containing graft copolymer is in the range of −125° C. to −90° C. as measured under [Measurement Condition 1] below. The grafting of the rubber (A) with the vinyl monomer (b) means that a graft portion composed of the vinyl monomer (b) is formed in the rubber (A) by graft polymerization of the vinyl monomer (b) in the presence of the rubber (A).

[Measurement Condition 1]

A test piece is formed by compression-molding the polyorganosiloxane-containing graft copolymer at 160° C. and 5

MPa to a thickness of 1 mm, the test piece is set in a dynamic viscoelastic device, and the tan δ is measured at a heating rate of 2° C./min and a frequency of 10 Hz using the tensile mode at temperatures ranging from −150° C. to 180° C.

The peak temperature of tan δ of the polyorganosiloxane-containing graft copolymer of the present invention is in the range of −125° C. to −90° C., and more preferably in a range of −80° C. to 0° C. from the viewpoint of achieving both of the low temperature impact strength and color developability when the graft copolymer is added to a thermoplastic resin (hereinafter sometimes simply referred to as "resin") and suppressing the change in color tone when exposed to severe conditions.

The peaks of tan δ of the polyorganosiloxane-containing graft copolymer at 0° C. less is derived from the polyorganosiloxane (A1). By various studies, we have found that this significantly affects the low-temperature impact strength when added to the resin, the change in color tone upon exposure to severe conditions. The graft copolymer in the present invention has a peak of tan δ (first peak) in the range of −125° C. to −90° C., whereby the balance between the low-temperature impact strength and color developability when the graft copolymer is added to the resin is improved to suppress the change in color tone upon exposure to severe conditions. The first peak of tan δ is more preferably has a range of −125° C. to −100° C. In addition, it is preferable to further have a peak (second peak) of tan δ of the graft copolymer in the temperature range of −80° C. to 0° C. because the balance between the low-temperature impact strength and the color developability when added to the resin and the suppression of the change of the color tone become better.

The first peak of tan δ in 0° C. or less can be set to a temperature range of −125° C. to −90° C. by appropriately controlling the particle size, composition, content of the polyorganosiloxane (A1), the type or content of the vinyl polymer (A2), polymerization method of the rubber (A) containing thereof and the type or content of the vinyl monomer (b) to be used for polymerizing the graft copolymer. Furthermore, it is possible to have the second peak of tan δ in a temperature range of −80° C. to 0° C. by better controlling.

In the graft copolymer of the present invention, the refractive index measured under the [Measurement Condition 2] is preferably in the range of 1.531 to 1.700, and more preferably in the range of 1.531 to 1.600.

[Measurement Condition 2]

The refractive index is measured by using the thinned polyorganosiloxane-containing graft copolymer by compression-molding, using an Abbe refractometer at a temperature 23° C. in accordance with JIS K 7142-A method.

It is preferable that the thermoplastic resin composition excellent in color development property can be obtained by setting the refractive index of the graft copolymer of the present invention to 1.531 or more, and that the thermoplastic resin composition excellent in low-temperature impact strength can be obtained by setting the refractive index to 1.700 or less. Refractive index of the graft copolymer of the present invention can be set to a desired value by adjusting the content of the polyorganosiloxane (A1), the type and amount of the vinyl polymer (A2) and the vinyl monomer (b).

This is because the refractive index of the graft copolymer of the present invention can be predicted as a value calculated using the following equation (Equation 1) described in POLYMER HANDBOOK 4th Edition (Wiley Interscience).

$$n = v_1 n_1 + v_2 n_2 + v_3 n_3 + \ldots \qquad \text{<Equation 1>}$$

Note that "n1, n2, n3, . . . " in the equation represents a refractive index at 20° C. of a homopolymer of each monomer, and the values described in POLYMER HANDBOOK-4th Edition can be used. Wherein "v1, v2, v3, . . . " denotes the volume fraction of each monomer.

[Polyorganosiloxane (A1)]

The polyorganosiloxane (A1) is a polymer containing an organosiloxane unit, in which at least one organic group is bonded to a silicon atom, as a structural unit. The polyorganosiloxane (A1) can be obtained by polymerizing an organosiloxane or an 'organosiloxane mixture' which includes an organosiloxane and at least one component used as needed. Examples of the components used as needed include a siloxane-based crosslinking agent, a siloxane-based graft crossing agent, and siloxane oligomers having a terminal blocking group.

As the organosiloxane, any of linear organosiloxanes, alkoxysilane compounds and cyclic organosiloxanes can be used. Among them, alkoxysilane compounds and cyclic organosiloxanes are preferable, and cyclic organosiloxanes are more preferable more preferable because the polymerization stability is high, and the polymerization rate is high.

The alkoxysilane compounds are preferably bifunctional alkoxysilane compounds, and examples thereof include dimethyl dimethoxy silane, dimethyl diethoxy silane, diethyl diethoxy silane, dimethyl dipropoxy silane, diphenyl dimethoxy silane, diphenyl diethoxy silane, methyl phenyl dimethoxy silane and methyl phenyl diethoxy silane.

The cyclic organosiloxane is preferably a 3 to 7 membered ring, and examples thereof include hexamethyl cyclotrisiloxane, octamethyl cyclotetrasiloxane, decamethyl cyclopentasiloxane, dodecamethyl cyclohexasiloxane, trimethyl triphenyl cyclotrisiloxane, tetramethyl tetraphenyl cyclotetrasiloxane, and octaphenyl cyclotetrasiloxane. These can be used alone or in combination of two or more thereof. Among these, octamethylcyclotetrasiloxane is preferable as the main component because the particle size distribution is easily controlled.

As the organosiloxane, it is preferable to use cyclic dimethylsiloxanes and/or bifunctional dialkyl silane compounds because a graft copolymer having higher low-temperature impact resistance can be obtained.

The cyclic dimethylsiloxanes are a cyclic siloxane having two methyl groups at a silicon atom, and the examples thereof include hexamethylcyclotrisiloxane, octamethyl cyclotetrasiloxane, decamethyl cyclopentasiloxane, and dodecamethyl cyclohexasiloxane.

Further, the bifunctional dialkyl silane compounds are a compound having two alkyl groups among the above bifunctional alkoxysilane compound, and examples thereof include dimethyl dimethoxy silane, dimethyl diethoxy silane, diethyl diethoxy silane, and dimethyl dipropoxy silane.

These can be used alone or in combination of two or more kinds.

The siloxane-based crosslinking agent preferably has a siloxyl group. By using the siloxane-based crosslinking agent, it is possible to obtain a polyorganosiloxane having a crosslinked structure. As the siloxane-based crosslinking agent, trifunctional or tetrafunctional silane crosslinking agent such as trimethoxy methyl silane, triethoxy phenyl silane, tetramethoxy silane, tetraethoxysilane, tetra-n-propoxy silane and tetrabutoxy silane can be mentioned. Among these, tetrafunctional crosslinking agents are preferable, tetraethoxysilane is more preferable. The content of the siloxane-based crosslinking agent, in 100% by mass the organosiloxane mixture, is preferably 0 to 30% by mass, more preferably 0 to be 15% by mass, still more preferably 0 to 5% by mass. By setting the content of the siloxane crosslinking agent to 0 to 30% by mass, it is possible to obtain a graft copolymer excellent in low-temperature impact resistance.

Siloxane-based graft crossing agents are those having a siloxyl group and polymerizable functional group with a vinyl monomer. By using the siloxane-based graft crossing agent, it is possible to obtain a polyorganosiloxane having polymerizable functional groups with a vinyl group. Since the polyorganosiloxane has a polymerizable functional group with a vinyl monomer, the polyorganosiloxane can be grafted with the vinyl monomer (A2) and the vinyl monomer (B) as described later by a radical polymerization.

The siloxane-based graft crossing agent can be exemplified a siloxane represented by formula (I):

$$RSiR^1_n(OR_2)_{(3-n)} \quad (I)$$

In formula (I), $R^1$ denotes a methyl group, an ethyl group, a propyl group, or a phenyl group. $R^2$ denotes an organic group in the alkoxy group, for example, a methyl group, an ethyl group, a propyl group, or a phenyl group. n denotes 0, 1 or 2. R denotes any of the groups represented by formulae (I-1) to (I-4):

$$CH_2=C(R^3)-COO-(CH_2)_p- \quad (I-1)$$

$$CH_2=C(R^4)-C_6H_4- \quad (I-2)$$

$$CH_2=CH- \quad (I-3)$$

$$HS-(CH_2)_p- \quad (I-4)$$

In these formulae, $R^3$ and $R^4$ are each hydrogen or methyl, p is an integer of 1 to 6.

Examples of the functional group represented by formula (I-1) include methacryloyloxyalkyl group. Examples of the siloxanes having this group include β-methacryloyloxyethyl dimethoxy methyl silane, γ-methacryloyloxypropyl methoxy dimethoxymethylsilane, γ-methacryloyloxypropyl dimethoxy methyl silane, γ-methacryloyloxypropyl trimethoxy silane, γ-methacryloyloxypropyl ethoxy diethyl silane, γ-methacryloyloxypropyl diethoxy methyl silane, and 6-methacryloyloxybutyl diethoxy methyl silane.

These siloxane-based graft crossing agents may be used singly or in combination of two or more. Content of the siloxane-based graft crossing agent is preferably 0 to 40% by mass, more preferably 0.05 to 40% by mass, further preferably 0.05 to 20% by mass based on 100% by mass of the organosiloxane mixture. By setting the content of the siloxane-based graft crossing agent to 0 to 40% by mass, it is possible to obtain a graft copolymer capable of providing a resin composition having a good balance between color developability and low-temperature impact resistance.

Further, a siloxane oligomer having a terminal blocking group means a siloxane oligomer having an alkyl group or the like at the end of the organosiloxane oligomer to stop the polymerization of the polyorganosiloxane.

Examples of the siloxane oligomer having a terminal blocking group include hexamethyl disiloxane, 1,3-bis(3-glycidoxypropyl) tetramethyl disiloxane, 1,3-bis(3-aminopropyl) tetramethyl disiloxane, and siloxane oligomers having trimethylsilyl group as the terminal blocking group.

[Production Method of Polyorganosiloxane (A1)]

The method for producing the polyorganosiloxane (A1) is not particularly limited, and for example, the following method can be employed. First, an emulsion is prepared by emulsifying an organosiloxane mixture containing an organosiloxane, optionally a siloxane-based crosslinking agent, optionally a siloxane-based graft crossing agent, and optionally a siloxane oligomer having a terminal blocking group with an emulsifier and water. Thereafter, the mixture is polymerized under a high temperature using an acid catalyst and then obtain a latex of the polyorganosiloxane by neutralizing the acid with an alkaline substance. In the following description of the manufacturing method, the case of using the "organosiloxane mixture" as raw materials will be described, but the same manufacturing process can also be applied when using the "organosiloxane" alone.

In this production method, as a process of preparing the emulsion, there are a method using a homomixer, which is made into fine particles by shear force by high-speed rotation, a method of mixing by a high speed stirring using a homogenizer or the like into fine particles by jet force by a high-pressure generator. Among these, the method of using a homogenizer is a preferred method since the distribution of the particle size of the latex of the polyorganosiloxane becomes narrow.

The method for mixing the acid catalyst in the polymerization includes, (1) a method in which the acid catalyst is added at once together with an organosiloxane mixture, emulsifier and water, and then mixed; (2) a method in which an aqueous solution of the acid catalyst is added collectively to an emulsion of the organosiloxane mixture; and (3) a method in which an emulsion of the organosiloxane mixture is added dropwise at a constant rate to an aqueous solution of the acid catalyst at high temperature and mixed. In view of easily controlling the particle size of the polyorganosiloxane, a method of holding an emulsion of organosiloxane mixture at elevated temperature, and then collectively adding the aqueous solution of the acid catalyst therein is preferred.

The polymerization temperature is preferably 50° C. or higher, and more preferably at 70° C. or higher. The polymerization time is, in case of polymerization by collectively adding the aqueous solution of the acid catalyst in the emulsion of organosiloxane mixture, is usually 2 hours or more, preferably 5 hours or more.

Furthermore, since the crosslinking reaction between the silanols proceeds at a temperature of 30° C. or lower, after subjecting polymerization at a high temperature of 50° C. or higher in order to increase the crosslinking density of the polyorganosiloxane, the resulting latex can be held at a temperature of 30° C. or lower for about 5 to 100 hours.

The polymerization reaction of the organosiloxane mixture can be terminated by neutralizing the latex-containing reaction system with alkaline substances such as sodium hydroxide and, potassium hydroxide, and aqueous solution of ammonia to pH 6 to 8.

The emulsifiers used in the above production method is not particularly limited as long as an organosiloxane mixture can be emulsified, but an anionic emulsifier or a nonionic emulsifier is preferred.

Examples of the anionic emulsifiers include sodium alkylbenzene sulfonate, sodium alkyl diphenyl ether disulfonate, sodium alkyl sulfate, sodium polyoxyethylene alkylsulfates, and sodium polyoxyethylene nonylphenyl ether sulfate.

The nonionic emulsifier includes, for example, the following: Polyoxyethylene alkyl ethers, polyoxyethylene alkylene alkyl ether, polyoxyethylene distyrenated phenyl ether, polyoxyethylene tribenzyl phenyl ether, polyoxyethylene polyoxypropylene glycol and the like.

These emulsifiers can be used singly or in combination of two or more thereof.

The used amount of emulsifier is preferably 0.05 to 10 parts by mass, more preferably 0.1 to 5 parts by mass, with respect to 100 parts by mass of the organosiloxane mixture. Depending on the used amount of the emulsifier, the particle size of the latex of the polyorganosiloxane can be adjusted to a desired value. When the amount of the emulsifier is 0.05 part by mass or more, the emulsification stability of the emulsion of organosiloxane mixture is sufficient. When the amount of the emulsifier is 10 parts by mass or less, the amount of emulsifier remaining in the powder of the graft copolymer can be sufficiently reduced so that the deteriorations of the thermal decomposition resistance and the surface appearance of the resin composition containing the graft copolymer can be suppressed.

As the acid catalyst used in the polymerization of an organosiloxane mixture, sulfonic acids such as an aliphatic sulfonic acid, aliphatic substituted benzenesulfonic acid, and aliphatic substituted naphthalene sulfonic acid, mineral acids such as sulfuric acid, hydrochloric acid, and nitric acid are mentioned. These acid catalysts may be used alone or in combination of two or more. Among these, when a mineral acid, such as sulfuric acid, hydrochloric acid and nitric acid, is used, the particle size distribution of the polyorganosiloxane latex can be narrowed, and furthermore, the reduction of the thermal decomposition resistance and the appearance defect of the molded article caused by the emulsifier component in the polyorganosiloxane latex can be suppressed.

The amount of the acid catalyst is preferably 0.005 to 5 parts by mass with respect to 100 parts by mass of the organosiloxane. When the amount of the acid catalyst is 0.005 parts by mass or more, the polyorganosiloxane can be polymerized in a short time. When the amount of the acid catalyst used is 5 parts by mass or less, it is possible to obtain a molded article excellent in a thermal decomposition resistance and appearance.

Further, since the amount of the acid catalyst used is a factor determining the particle size of the polyorganosiloxane, in order to obtain a polyorganosiloxane having the particle size described later, it is more preferable to set the amount of the acid catalyst used to 0.005 to 1.5 parts by mass.

The mass average particle size of the polyorganosiloxane in the latex is not particularly limited, it is preferably in the range of 250 to 1,000 nm. By setting the mass average particle size of the polyorganosiloxane in the range of 250 to 1,000 nm, it is possible to adjust the mass average particle size of the rubber (A) in the range of 300 to 2,000 nm.

"Weight average particle diameter/number average particle diameter (Dw/Dn)" of the polyorganosiloxane in the latex is preferably within the range of 1.0 to 1.7. By setting the Dw/Dn in the range of 1.0 to 1.7, it is possible to obtain a highly transparent graft copolymer when added to resins.

The values of Dw and Dn can adopt values measured via the following method. A product formed by diluting the polyorganosiloxane latex to a concentration of about 3% via deionized water is used as the sample, and the particle size is measured using a CHDF2000-type particle size distribution meter made by Matec Corporation. The particle size adopts a median diameter as the average particle size.

The measurement can be performed under the following standard conditions recommended by Matec Corporation.
Cartridge: dedicated capillary-type cartridge for particle separation (trade name: C-202),
carrier fluid: dedicated carrier fluid (trade name: 2XGR500),
liquid properties of carrier fluid: substantially neutral,
flow velocity of carrier fluid: 1.4 ml/min,
pressure of carrier fluid: about 4,000 psi (2,600 kPa),
measured temperature: 35° C.,
sample usage amount: 0.1 ml.

Moreover, the standard particle substance adopts monodispersed polyethylene made by Duke Corporation for which the particle size is known, and 12 types of particles for which the particle size is in the range of 40 nm to 800 nm.

In the polyorganosiloxane latex obtained via the above method, an emulsifier can also be added as needed for the purpose of increasing mechanical stability. The emulsifier is preferably the same anionic emulsifier or nonionic emulsifier exemplified above.

[Vinyl Polymer (A2)]

The vinyl polymer (A2) of the present invention includes a polymer obtained by polymerizing a monofunctional vinyl monomer (a1) having a glass transition temperature of 0° C. or more as a homopolymer and a polyfunctional vinyl monomer (a2).

[Monofunctional Vinyl Monomer (a1)]

The monofunctional vinyl monomer (a1) of the present invention is necessary to have 0° C. or higher of the glass transition temperature as the homopolymer. Glass transition temperature of a homopolymer, for example, can refer to values according to POLYMER HANDBOOK 4th Edition.

The monofunctional vinyl monomer of the present invention (a1), for example, the monomers are exemplified as follows:

Aromatic vinyl monomers such as styrene, α-methyl styrene and vinyl toluene; alkyl methacrylates such as methyl methacrylate, ethyl methacrylate, n-butyl methacrylate, and i-butyl methacrylate;

alkyl acrylates such as methyl acrylate, i-butyl acrylate, t-butyl acrylate, and hexadecyl acrylate;

alicyclic (meth)acrylates, in which the ester group is an alicyclic group, such as cyclohexyl (meth)acrylate, cyclododecyl (meth) acrylate;

aryl (meth)acrylates in which the ester group is a phenyl group or substituted phenyl group, such as phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, and trichlorophenyl (meth)acrylate;

vinyl cyanide monomers such as acrylonitrile and methacrylonitrile.

These can be used singly or in combination of two or more thereof.

Among them, it is preferable to use the aromatic vinyl monomer such as styrene in order to set the first peak of tan δ of the graft copolymer in the range of −125° C. to −90° C., and further in order to have a second peak in the temperature range of −80° C. to 0° C.

From the viewpoint of adjusting the refractive index within the range of 1.531 to 1.700, it is preferable to use the aromatic vinyl monomers and/or the alicyclic (meth)acrylates, in which the ester group is an alicyclic group, and/or the aryl (meth)acrylates, in which the ester group is a phenyl group or substituted phenyl group.

[Polyfunctional Vinyl Monomer (a2)]

Examples of the polyfunctional vinyl monomers include the following multifunctional monomers:

Allyl methacrylate, triallyl cyanurate, triallyl isocyanurate, divinylbenzene, ethylene glycol dimethacrylate, propylene glycol dimethacrylate, 1,3-butylene glycol dimethacrylate, 1,4-butylene glycol dimethacrylate, 1,6-hexanediol diacrylate, triallyl trimellitate, etc.

These can be used singly or in a combination of two or more thereof.

In the vinyl polymer (A2), the contents of the monofunctional vinyl monomer (a1) and the polyfunctional vinyl monomer (a2) are 90 to 100% by mass of the monofunctional vinyl monomer (a1) and 10 to 0% by mass of the polyfunctional vinyl monomer (a2), preferably 90 to 99.9% by mass of the monofunctional vinyl monomer (a1) and 10 to 0.1% by mass of the polyfunctional vinyl monomer (a2), and more preferably 97 to 99.9% by mass of the monofunctional vinyl monomer (a1) and 3 to 0.1% by mass of the polyfunctional vinyl monomer (a2), based on 100% by mass of the vinyl polymer (A2) from the viewpoint of the low-temperature impact strength and color developability when the graft copolymer is added to a resin.

As a method for producing the vinyl polymer (A2), not particularly limited, for example, it can be produced by an emulsion polymerization, a suspension polymerization and a micro-suspension polymerization method, and it is preferable to use the emulsion polymerization method.

A radical polymerization initiator used in the polymerization of the vinyl monomer (a2) can adopt an azo-based initiator, peroxide, and a redox-based initiator formed by the combination of peroxide and a reducing agent. These can be used singly or in a combination of two or more thereof. Among these, an azo-based initiator or a redox-based initiator is preferred.

The azo-based initiator can include, for instance, the following.

An oil-soluble azo-based initiator such as 2,2'-azobisisobutyronitrile, dimethyl 2,2'-azobis(2-methyl propionate), 2,2'-azobis(2,4-dimethyl valeronitrile), or 2,2'-azobis (2-methyl butyronitrile); and a water-soluble azo-based initiator such as 4,4'-azobis(4-cyanopentanoic acid), 2,2'-azobis[N-(2-carboxymethyl)-2-methylpropionamidine]hydrate, 2,2'-azobis-(N,N'-dimethylene isobutyl amidine)dihydrochloride, or 2,2'-azobis[2-(2-imidazolin-2-yl)propane] dihydrochloride.

These can be used singly or in a combination of two or more thereof.

The peroxide can include, for instance, the following:

Inorganic peroxide such as hydroperoxide, potassium persulfate, or ammonium persulfate; and organic peroxide such as diisopropyl benzene hydroperoxide, p-menthane hydroperoxide, cumene hydroperoxide, t-butyl hydroperoxide, succinic acid peroxide, t-butyl peroxy neodecanoate, t-butyl peroxyneoheptanoate, t-butyl peroxy trimethylacetate, 1,1,3,3-tetramethylbutyl peroxy-2-ethylhexanoate, or t-butyl peroxy-2-ethylhexanoate.

These can be used singly or in a combination of two or more thereof.

When the redox-based initiator is formed by the combination of peroxide and a reducing agent, the above peroxide and a reducing agent such as sodium formaldehyde sulfoxylate, L-ascorbic acid, fructose, dextrose, sorbose, or inositol are preferably combined with ferrous sulfate-ethylenediamine tetraacetic acid disodium salt. These reducing agents can be used singly or in a combination of two or more thereof.

Radical polymerization initiator used in the polymerization of vinyl monomer (a2) has preferably a solubility of 5% by mass or less for water at 20° C., more preferably 2% by mass or less. By polymerized using the radical polymerization initiator, it is possible to obtain a graft copolymer excellent in a low-temperature impact resistance.

The radical polymerization initiator having a solubility of 5% by mass or less for water at 20° C. can include, for instance, the following:

Cumene hydroperoxide, diisopropyl benzene hydroperoxide, p-menthane hydroperoxide, t-butyl peroxy neodecanoate, t-butyl peroxyneoheptanoate, t-butyl peroxytrimethylacetate, 1,1,3,3-tetramethylbutyl peroxy-2-ethylhexanoate, t-butyl peroxy-2-ethylhexanoate, 2,2'-azobisisobutyronitrile, dimethyl 2,2'-azobis(2-methyl propionate), 2,2'-azobis(2,4-dimethylvaleronitrile), 2,2'-azobis (2-methyl butyronitrile), etc.

These can be used singly or in a combination of two or more thereof.

The solubility of the radical polymerization initiator for water at 20° C. can be known from, for instance, a catalog of various radical polymerization initiators.

The amount of the radical polymerization initiator used, when using azo-based initiator, is preferably 0.01 to 1 part by mass based on a total 100 parts by mass of the monomer. In the case of a redox-based initiator, based on a total 100 parts by mass of the monomer, the amount of the peroxide used is preferably 0.01 to 1 part by mass. The amount of the reducing agent used is preferably 0.01 to 1 part by mass based on a total 100 parts by mass of the monomer from the viewpoint of an outgas resistance.

[Rubber (A)]

The rubber (A) of the invention contains the polyorganosiloxane (A1) and the vinyl polymer (A2). The rubber (A) can include, for instance, rubbers having the following structures of (1) to (5):

(1) a rubber having a multilayer structure and having a structure in which the core of the polyorganosiloxane (A1) is covered by the shell of the vinyl polymer (A2);

(2) a rubber having a multilayer structure and having a structure in which the core of the vinyl polymer (A2) is covered by the shell of the polyorganosiloxane (A1);

(3) a composite rubber containing the polyorganosiloxane (A1) and the vinyl polymer (A2) and having an intervention structure to each other;

(4) a composite rubber including a sea-island structure in which the polyorganosiloxane (A1) is an island and the vinyl polymer (A2) is a sea; and (5) a composite rubber including a sea-island structure in which the polyorganosiloxane (A1) is a sea and the vinyl polymer (A2) is an island.

Among these, the rubber having the structure (5) is preferable because it can be controlled so that the first peak of tan δ of the polyorganosiloxane-containing graft copolymer is in the temperature range of −125° C. to −90° C. and the second peak is in the temperature range of −80° C. to 0° C., and therefore, the balance between the low-temperature impact strength and the color developability when the graft copolymer is added to the resin and the suppression of the change of the color tone under severe conditions are favorable.

The contents of polyorganosiloxane (A1) and vinyl polymer (A2) are preferably 0.1 to 40% by mass of polyorganosiloxane (A1) and 41 to 99.9% by mass of vinyl polymer (A2) with respect to 100% by mass of polyorganosiloxane-containing graft copolymer. With these ranges, since the amount of the vinyl polymer (A2) with respect to the polyorganosiloxane (A1) is within an appropriate range, the first peak of tan δ is in the range of −125° C. to −90° C., and the balance of the low-temperature impact strength and the color developability when the graft copolymer is added to the resin and the suppression of the change in color tone are improved. The more preferred range is the content of the polyorganosiloxane (A1) being 10-29% by mass and the content of the vinyl polymer (A2) being 41 to 85% by mass based on 100% by mass of the polyorganosiloxane-containing graft copolymer. With these ranges, it is possible to have further the second peak of the tan δ within a temperature range of −80° C. to 0° C., and the balance of the low-temperature impact strength and the color developability when the graft copolymer is added to the resin and the suppression of the change in color tone are further improved. In addition, the graft copolymer is excellent in flame-retardant.

Thus, in another embodiment of the present invention, there is provided a polyorganosiloxane-containing graft copolymer in which a rubber (A) containing 0.1 to 40% by mass of a polyorganosiloxane (A1) and 41 to 99.8% by mass of a vinyl polymer (A2) is grafted with 0.1 to 19% by mass of vinyl monomer (b) with respect to 100% by mass of the polyorganosiloxane-containing graft copolymer, wherein the vinyl polymer (A2) is a vinyl copolymer of 90 to 100% by mass of monofunctional vinyl monomer (a1) and 10 to 0% by mass of polyfunctional vinyl monomer (a2), and wherein the monofunctional vinyl monomer (a1) has a glass transition temperature of 0° C. or more.

As a method for producing rubber (A) is not particularly limited, it can be produced by methods of, for example, emulsion polymerization, suspension polymerization, and a micro-suspension polymerization, and it is preferable to use the emulsion polymerization method. In particular, it is preferable rubber (A) is the structure (5) described above. As a method for obtaining a rubber having the structure (5), a method of polymerizing the monofunctional vinyl monomer (a1) having a glass transition temperature of 0° C. or more as the homopolymer and the polyfunctional vinyl monomer (a2) in the presence of a polyorganosiloxane rubber. Specifically, the monofunctional vinyl monomer (a1) having a glass transition temperature of 0° C. or more as the homopolymer and the polyfunctional vinyl monomer (a2) are firstly added in the latex of the polyorganosiloxane rubber to be impregnated in the polyorganosiloxane, and then polymerized using a known radical polymerization initiator. In this method, the addition of the monofunctional vinyl monomer (a1) and the polyfunctional vinyl monomer (a2) is a method of adding the whole amount of them in polyorganosiloxanes latex at once, or a method of adding dropwise at a constant speed by dividing them.

In producing the latex of rubber (A), an emulsifier can be added to stabilize the latex and control the particle size of the rubber (A). Examples of the emulsifier include those similar to the emulsifiers used in producing the latex of the polyorganosiloxane as described above, and the anionic emulsifiers and the nonionic emulsifiers are preferable.

The weight average particle diameter (Dw) of the rubber (A) is not particularly limited, but the lower limit is preferably 50 nm or more, more preferably 100 nm or more, still more preferably 200 nm or more, further still more preferably 300 nm or more, and particularly preferably 400 nm or more. The upper limit of the mass average particle size of the rubber (A) (Dw) is preferably 2000 nm or less, more preferably 1000 nm or less. When the mass average particle size of the rubber (A) is 50 nm or more, in a structure that the polyorganosiloxane (A1) is a sea and the vinyl polymer (A2) is an island, the domain size of the vinyl polymer (A2) increases and the interaction with the polyorganosiloxane (A1) is increased, so that it is preferably possible to have the peak of tan δ of the polyorganosiloxane-containing graft copolymer in the temperature range of −125° C. to −90° C. (first peak), and in the temperature range of 80° C. to 0° C. (second peak). When the mass average particle size is 2000 nm or less, it is preferably possible to improve surface appearance and low-temperature impact resistance of the molded article.

[Vinyl Monomer (b)]

By polymerizing a vinyl monomer (b) in the presence of the rubber (A) to form a graft portion consisting of the vinyl polymer in the rubber (A), the polyorganosiloxane-containing graft copolymer can be obtained.

Examples of the vinyl monomer (b) include the following: the monomers are exemplified as follows: Aromatic vinyl monomers such as styrene, α-methyl styrene and vinyl toluene; alkyl methacrylates such as methyl methacrylate, ethyl methacrylate, n-butyl methacrylate, and i-butyl methacrylate; alkyl acrylates such as ethyl acrylate, n-butyl acrylate, and methyl acrylate; vinyl cyanide monomers such as acrylonitrile and methacrylonitrile; and aryl (meth)acrylates in which the ester group is a phenyl group or substituted phenyl group, such as phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, and trichlorophenyl (meth)acrylate. These can be used singly or in combination of two or more thereof. Among these, aromatic vinyl monomers, alkyl (meth)acrylates, vinyl cyanide monomers, and aryl (meth) acrylates in which the ester group is a phenyl group or substituted phenyl group are preferable from the viewpoint of compatibility with a resin and the color developability of the resin composition. These vinyl monomers (b) can be used singly or in combinations of two or more thereof.

The vinyl monomer (b) may include a crosslinkable monomer, and in this case, the amount of the crosslinkable monomer in 100% by mass of the vinyl monomer (b) is preferably 0.005% by mass or less.

The content of rubber (A) in the graft copolymer is preferably 10.0 to 99.9% by mass relative to 100% by mass of the graft copolymer. It is preferable that the low-temperature impact strength of the resin composition becomes sufficient when the content of the rubber (A) is 10.0% by mass or more, and the surface appearance of the molded article becomes good when the content is 99.9% by mass or less. From the viewpoint of further improving the low-temperature impact strength of the resin composition, the content of the rubber (A) is more preferably 50.0 to 99.9% by mass, and more preferably 81.0 to 99.9% by mass relative to 100% by mass the graft copolymer.

The method of graft copolymerization includes, for example, a method in which a vinyl monomer (b) is added to a latex of the rubber (A), and polymerized in one stage or multiple stages. In the case of the polymerization in multiple stages, it is preferably that the total amount of the vinyl monomer (b) used is divided, and sequentially added or continuously added to polymerize in the presence of a latex of the rubber (A). Such a polymerization method is excellent in polymerization stability, and a latex having a desired particle size and particle size distribution can be stably obtained.

In the polymerization of the graft part, an emulsifier can be added as necessary. The emulsifier used in the polymerization of the graft part includes the same groups as those described above emulsifiers used in the manufacture of rubber (A), an anionic emulsifier and a nonionic emulsifier are preferred.

When the powder of the graft copolymer is recovered from the latex of the graft copolymer, either the spray drying method or the coagulation method can be used.

The spray drying method is a method in which a latex of a graft copolymer is sprayed in a microdroplet form into a dryer, and heated gas for drying is applied to the latex to dry the latex. Methods for generating microdroplets include, for example, methods of using a rotating disk, a pressure nozzle, a two-fluid nozzle, and a pressurized two-fluid nozzle. The capacity of the dryer may be any of a small capacity, such that used in a laboratory, or a large capacity, such that used industrially. The temperature of the heating gas for drying is preferably 200° C. or less, more preferably 120 to 180° C. Two or more latexes of graft copolymers separately prepared can also be spray dried together. Further, in order to improve powder characteristics such as blocking and bulk density at the time of spray drying, an optional component such as silica can be added to the latex of the graft copolymer and spray drying can be performed.

The coagulation method is a method in which a latex of a graft copolymer is coagulated, and the graft copolymer is separated, recovered, and dried. First, a latex of graft copolymer is poured into hot water containing dissolved coagulant, salted out, and coagulated to separate the graft copolymer. Then, the separated wet graft copolymer is subjected to dehydration or the like to recover a graft copolymer whose water content decreases. The recovered graft copolymer is dried by using a compression dehydrator or a hot air dryer.

Examples of the coagulants include inorganic salts such as aluminum chloride, aluminum sulfate, sodium sulfate, magnesium sulfate, sodium nitrate, and calcium acetate, and acids such as sulfuric acid, and calcium acetate is particularly preferred. While these coagulants can be used alone or in combination two or more thereof, in the case of using two or more thereof, it is necessary to select a combination which does not form insoluble salts in water. For example, when calcium acetate is used in combination with sulfuric acid or sodium sulfate, it unfavorably forms a calcium salt insoluble in water.

The coagulant is usually used as an aqueous solution. The concentration of the coagulant aqueous solution is preferred 0.1% by mass or more, in particular 1% by mass or more from the viewpoint of stably coagulating and recovering the graft copolymer. Further, from the viewpoint of reducing the amount of the coagulant remaining in the graft copolymer to prevent a deterioration of the molding appearance of the molded article, the concentration of the coagulant aqueous solution is preferably 20% by mass of less, especially 15% by mass or less. The amount of coagulant solution is not particularly limited, but it is preferably 10 parts by mass or more and 500 parts by mass or less per 100 parts by mass of the latex.

Method of contacting the latex with coagulant aqueous solution is not particularly limited, but the following method is usually mentioned. (1) A method of continuously adding the latex to the coagulant aqueous solution while stirring and holding the solution for a predetermined time, and (2) a method of contacting the coagulant aqueous solution and the latex, while adding them with a constant rate into a vessel equipped with a stirrer, and continuously taking out a mixture containing coagulated polymer and water from the vessel. The temperature at which the latex is contacted with the coagulant aqueous solution is not particularly limited, but it is preferably 30° C. or more and 100° C. or less. The contact time is not particularly limited.

The coagulated graft copolymer is washed with about 1 to 100 times by mass of water, and a wet graft copolymer separated by filtration is dried with a fluid dryer or a compression dehydrator and the like. The drying temperature and drying time may be appropriately determined depending on the obtained graft copolymer. Note that, the graft copolymer discharged from the compression dehydrator or an extruder may be directly sent to extruder or a molding machine for producing a resin composition without being recovered, and may be mixed with a thermoplastic resin to obtain a molded article.

In the present invention, the graft copolymer is preferably recovered using a coagulation method from the viewpoint of the thermal decomposition resistance of the resin composition obtained by mixing the thermoplastic resin.

The second embodiment of the present invention is a graft copolymer having a dispersed phase (A phase) and a continuous phase (B phase) wherein, in an elastic modulus image measured in [Measurement Condition 3], an elastic modulus in the A phase is 0.4 GPa or more, and an elastic modulus in the B phase is 0.2 GPa or less, and wherein an average diameter of the A phase measured in [Measurement Condition 4] is 50 nm or more. To distinguish the polyorganosiloxane-containing graft copolymer of the first embodiment, the graft copolymer of the present embodiment is sometimes referred to as "graft copolymer (G1)", but this reference does not prevent the graft copolymer (G1) of the second embodiment is the same with the graft copolymer of the first embodiment.

[Measurement Condition 3]

The particles of the graft copolymer are taken up in a capsule, the room temperature curing epoxy resin is poured, the capsule is left to cure for 12 hours at 25° C., and the obtained resin pieces are used as Sample 1 by ultramicrotome (trade name "Leica EM UC7", manufactured by Leica Microsystems Co., Ltd.) and exposed at room temperature using a glass knife. Sample 1 is subjected to scanning probe microscopy (manufactured by Veeco Instruments, Inc.) to acquire an elastic modulus image of the particles in a scanning area of 1 μm square.

In the elastic modulus image of the particle, a histogram of the elastic modulus of a rectangular region inscribed in the particle is obtained, the peak top of the Gaussian curve of the histogram is defined as the elastic modulus of the phase B. A histogram of the elastic modulus is also obtained in a region having a size of 50 nm square or more included in a region having an elastic modulus of 0.20 GPa or more in the particle, and the peak top of the Gaussian curve of the histogram is defined as the elastic modulus of the phase A.

Figure 1B:
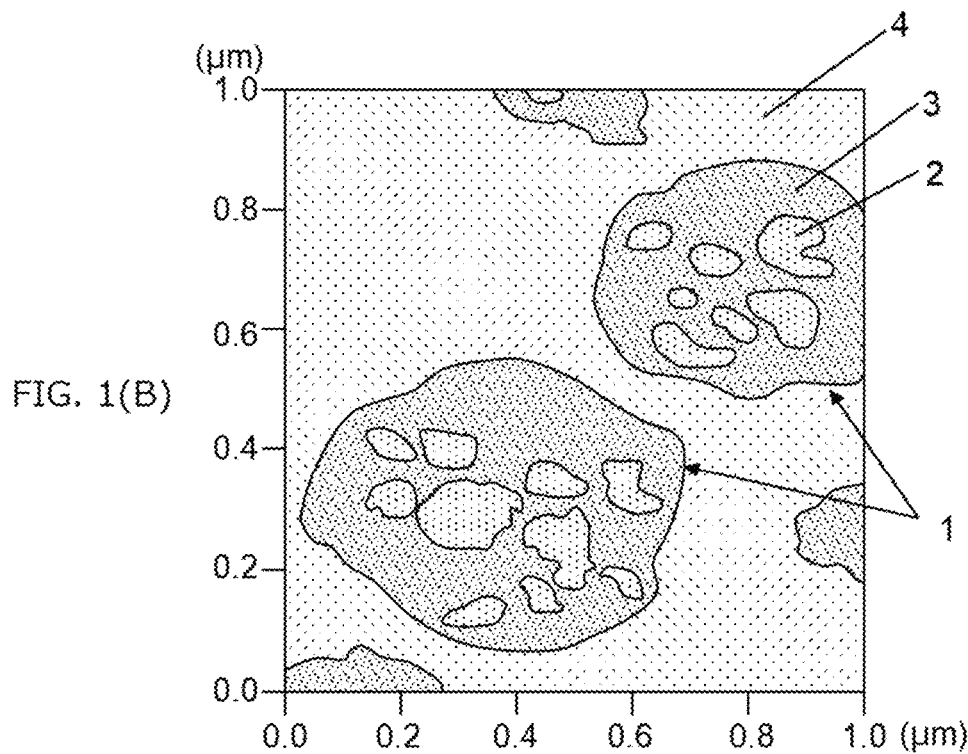

FIG. 1 shows (A) an example of an elastic modulus image according to the resulting scanning probe microscope obtained by Measurement Conditions 3 and (B) its schematic view. As shown in the schematic view (B), a plurality of graft copolymer particles 1 can be confirmed in 1 μm-square of the scan range, dispersion phases 2 surrounded by a continuous phase 3 observed in the particles 1. 4 is a cured layer of an epoxy resin when producing the samples.

Figure 2:
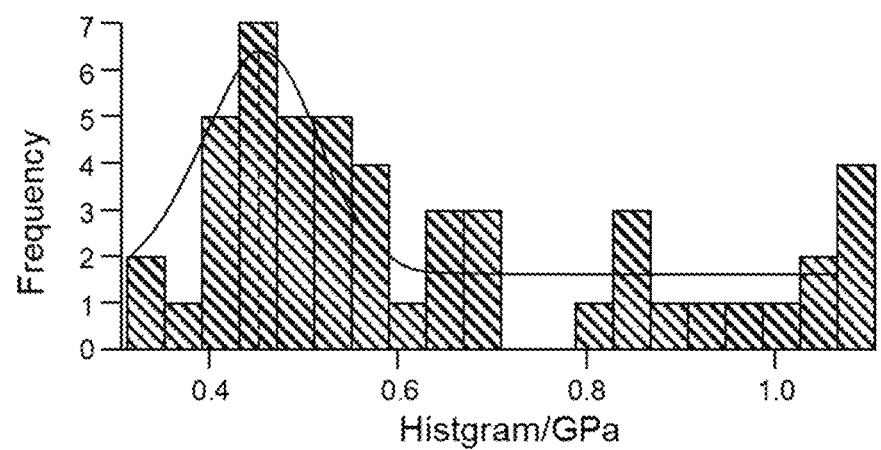
FIG. 2 It is an example of a histogram for obtaining the elastic modulus of A phase.

Also, FIG. 2 shows an example of a histogram of the modulus in the region of 50 nm-square or more sized to be included in an area having an elastic modulus of 0.20 GPa or more in said particle. In FIG. 2, a solid line indicates the Gaussian curve in the histogram, the peak top the curve is the elastic modulus of the dispersed phase (A phase).

[Measurement Condition 4]

The resin piece obtained by the Measurement Condition 3 is exposed and trimmed by the above ultramicrotome using a diamond knife at room temperature, and a slice is cut out under the condition of a thickness of 50 nm, and collected on a grid with a support film to use sample 2. Sample 2 is placed on a transmission electron microscope (trade name: "H-7600", Hitachi Co., Ltd.), to obtain a particle image at an acceleration voltage of 80 kV, a magnification of 200,000×. The obtained particle images are subjected to flatten the background brightness unevenness, remove noises, enhance edges, and binarize using image analysis software (trade name "Image-Pro® Plus", Nippon Roper K. K.). In the obtained particle image, a phase that appeared to be bright contrast is extracted by binarization, and 10 points are selected in order from the phases with the largest diameter that can be visually recognized in one particle image, and the average diameter thereof is obtained. Further, an average value is obtained for the average diameters of 10 particles, and the average value is defined as the average diameter of the A phase.

Incidentally, in the "Measurement Condition 4", the phases that are visible on one graft copolymer particle are of less than 10 points, select all the phases, and an average diameter of them is obtained. The diameter to be measured, signed two points of the outer periphery of the target phase, and an average value obtained by measuring the diameter passing through the center of gravity in increments twice.

<Phase>

The graft copolymer (G1) includes a phase having 0.4 GPa or more of the elastic modulus (A phase) and a phase having 0.2 GPa or less of the elastic modulus (B phase). The A phase is a dispersed phase, and the B phase is a continuous phase as the phase structures, and the size (average diameter) of the A phase of the graft copolymer (G1) is at 50 nm or more, more preferably 60 nm or more. When the A phase is the dispersed phase and the B phase is the continuous phase, it is possible to lower the elastic modulus of the graft copolymer (G1), it shows an excellent impact resistance when used as an impact strength modifier.

The size of the A phase is at 50 nm or more, preferably 60 nm or more. When the size of the A phase is 50 nm or more, a cavitation is likely to occur, and more likely to occur when it comes to 60 nm or more, so that shows the excellent impact resistance when used as an impact strength modifier.

<A Phase>

A phase is preferably contained in two or more per one particle of the graft copolymer (G1). When two or more A phases are included, the size of the A phase is not larger than necessary, and the graft copolymer (G1) shows the excellent impact resistance when used as an impact strength modifier because modulus thereof can be further lowered.

The A phase is preferably a phase containing an aromatic vinyl polymer. If it is phase containing an aromatic vinyl polymer, it is preferably to indicate excellent impact resistance since the elastic modulus is high and it tends to be starting points of cavitation when used as an impact strength modifier. The aromatic vinyl polymer has a high refractive index, preferable because of its excellent coloring property when used as an impact strength modifier.

Examples of the aromatic vinyl polymer include homo- or copolymer of styrene and various substituted styrenes, such as p-methylstyrene, m-methylstyrene, o-methylstyrene, o-t-butylstyrene, m-t-butylstyrene, p-t-butylstyrene, p-chlorostyrene, o-chlorostyrene, α-methylstyrene, and vinyl toluene.

The phase containing an aromatic vinyl polymer (A phase) can include, other than the aromatic vinyl polymer, homo- or copolymer of: alkyl methacrylates such as methyl methacrylate, ethyl methacrylate, n-butyl methacrylate, i-butyl methacrylate; alkyl acrylates such as methyl acrylate, ethyl acrylate, n-butyl acrylate; vinyl cyanide monomers such as acrylonitrile, methacrylonitrile; aryl (meth)acrylates, that have a phenyl group or substituted phenyl groups as an ester group, such as phenyl (meth)acrylate, 4-t-butylphenyl (meth)acrylate, bromophenyl (meth)acrylate, dibromophenyl (meth)acrylate, 2,4,6-bromophenyl (meth)acrylate, monochlorophenyl (meth)acrylate, dichlorophenyl (meth)acrylate, and trichlorophenyl (meth)acrylate. These can be used singly or in combinations of two or more thereof.

<B Phase>

The B phase is preferably a phase containing polyorganosiloxane. If it is phase containing polyorganosiloxane, low elastic modulus, because Poisson's ratio close to 0.5, easily deformed when added to the thermoplastic resin, thereby to indicate excellent impact properties, impact the preferred as the intensity modifier.

The phase containing polyorganosiloxane can also include, other than the polyorganosiloxane, homo- or copolymer of: alkyl methacrylates such as methyl methacrylate, ethyl methacrylate, n-butyl methacrylate, i-butyl methacrylate; alkyl acrylates such as methyl acrylate, ethyl acrylate, n-butyl acrylate; vinyl cyanide monomers such as acrylonitrile, methacrylonitrile; aryl (meth)acrylates, that have a phenyl group or substituted phenyl groups as an ester group, such as phenyl (meth)acrylate, 4-t-butylphenyl (meth)acrylate, bromophenyl (meth)acrylate, dibromophenyl (meth)acrylate, 2,4,6-bromophenyl (meth)acrylate, monochlorophenyl (meth)acrylate, dichlorophenyl (meth)acrylate, and trichlorophenyl (meth)acrylate. These can be used singly or in combinations of two or more thereof.

The polyorganosiloxanes in the phase containing polyorganosiloxane is a polymer containing an organosiloxane units in which at least one organic group is bonded to a silicon atom as a constituent unit, similarly to (A1) described above. Further, it is possible to use siloxane graft crossing agent and a siloxane-based crosslinking agent described above as needed.

As a method for producing the graft copolymer (G1), but not particularly limited, for example, an emulsion polymerization, a suspension polymerization, and a micro-suspension polymerization method can be used, and it is preferable to use the emulsion polymerization method. As a manufacturing process, for example, a process of polymerizing a monomer mixture containing an aromatic vinyl monomer in the presence of the polyorganosiloxane rubber. Specifically, first, a monomer mixture containing an aromatic vinyl monomer is added to a latex of the polyorganosiloxane rubber and the monomers are impregnated in the polyorganosiloxane, and then polymerized using a known radical polymerization initiator. In this method, the addition of the monomer mixture containing the aromatic vinyl monomer is a method of adding the whole amount of them in polyorganosiloxanes latex at once, or a method of adding dropwise at a constant speed by dividing them.

The weight average particle diameter (Dw) of the graft copolymer (G1) is not particularly limited, but is preferably 300 to 2000 nm, more preferably 300 to 1000 nm, still more preferably 350 to 1000 nm, furthermore preferably 400 to 800 nm. It is preferable that when the weight average particle diameter is 300 nm or more, the low-temperature impact strength and color developability are excellent, and when it is 2000 nm or less, the surface appearance and low temperature impact resistance of the molded article are improved.

When a powder of the graft copolymer (G1) is recovered from the latex of the graft copolymer (G1), either the spray drying method or the coagulation method can be used as described above. From the viewpoint of the thermal decomposition resistance of the resin composition obtained by mixing the powder with a thermoplastic resin, it is preferably recovered using the coagulation method.

<Thermoplastic Resin Composition>

The "graft copolymer" as used in the thermoplastic resin composition of the present invention may be either the polyorganosiloxane-containing graft copolymer described in the first embodiment or the graft copolymer of (G1) described in the second embodiment. The graft copolymer can be mixed with a thermoplastic resin used as a thermoplastic resin composition.

In the following description, the polyorganosiloxane-containing graft copolymer described in the first embodiment and the graft copolymer (G1) described in the second embodiment may be simply referred to as "graft copolymer".

The thermoplastic resins usable in the present invention is not particularly limited, examples thereof include one or more resins selected from thermoplastic resins and thermoplastic elastomers.

[Thermoplastic Resin]

Examples of the thermoplastic resin include the followings. Olefinic resins such as polypropylene (PP) and polyethylene (PE); styrene-based (St) resins such as polystyrene (PS), high-impact polystyrene (HIPS), (meth) acrylate-styrene copolymer (MS), styrene-acrylonitrile copolymer (SAN), styrene-maleic anhydride copolymer (SMA), acrylonitrile-butadiene-styrene copolymer (ABS), acrylic ester-styrene-acrylonitrile copolymer (ASA), acrylonitrile-ethylene-propylene rubber-styrene copolymer (AES); acrylic (Ac) resins such as polymethyl methacrylate (PMMA); polycarbonate (PC) resin; polyamide (PA) resin; polyester (PEs) resins such as polyethylene terephthalate (PET), polybutylene terephthalate (PBT); engineering plastics such as (modified) polyphenylene ether ((m-)PPE) resin, polyoxymethylene (POM) resin, polysulfone (PSO) resin, polyarylate (PAr) resin, polyphenylene (PPS) resin; thermoplastic polyurethane (PU) resin; vinyl chloride-based (PVC) resins such as hard vinyl chloride resins, semi-hard vinyl chloride resin, soft vinyl chloride resin; alloys of PC resin and St resin such as PC/ABS; alloys of PVC resin and St resin such as PVC/ABS; alloys of PA resin and St resin such as PA/ABS; alloys of PA resin and a thermoplastic elastomer (TPE); alloys of PA resin and polyolefin resin such as PA/PP; alloys of PC resin and PEs resin such as PC PBT; alloys between olefin resins such as PP/PET, PP/PE; alloys of PPE resin and other resins such as PPE/HIPS, PPE/PBT, PPE/PA; and alloys of PVC resin and acrylic resin such as PVC/PMMA.

Examples of the thermoplastic elastomer include the following. Styrene elastomers, olefin elastomers, vinyl chloride elastomers, urethane elastomers, polyester elastomers, polyamide elastomers, fluorine elastomers, 1,2-polybutadiene, trans-1,4-polyisoprene. Among these, urethane elastomers, polyester elastomers and polyamide elastomers are preferable.

Among the thermoplastic resins, the following are preferred. St resins, PC resins, PA resins, PET resins, PBT resins, (m-)PPE resins, POM resins, PU resins, alloys of PC resins and St resins such as PC/ABS, alloys of PA resin and St resin such as PA/ABS, alloys of PA resin and TPE, alloys of PA resin and a polyolefin resin such as PA/PP, alloys of PC resin and PEs resin such as PC/PBT, alloys of PPE resin and other resins such as PPE/PBT, PPE/PA.

Furthermore, among the above resins, polycarbonate resins are preferred and aromatic polycarbonate resins are particularly preferred from the viewpoint of maximizing the improving effect of pigment coloration.

The aromatic polycarbonate resin is an optionally branched thermoplastic aromatic polycarbonate polymer or copolymer obtained by reacting an aromatic hydroxy compound or a mixture of it and a small amount of polyhydroxy compound with phosgene or a dicarbonate. The production method of the aromatic polycarbonate resin is not particularly limited, and known methods, i.e., phosgene method (interfacial polymerization method), molten polymerization method (transesterification method). In the present invention, an aromatic polycarbonate resin produced by the molten polymerization method, and controlled content of terminal OH groups can also be used.

Examples of the aromatic polycarbonate resin include the following. lupilon (registered trademark) S-1000, S-2000, S-3000, H-3000 or H-4000 (manufactured by Mitsubishi Engineering-Plastics Corporation), or Panlite (registered trademark) L1250, L1225 or K1300 (manufactured by Teijin Kasei Co., Ltd.), and the like.

The content of the graft copolymer in the total 100% by mass of the thermoplastic resin and the graft copolymer is preferably 0.5 to 50% by mass, more preferably 1 to 20% by mass. When the content of the graft copolymer is 0.5% by mass or more, a resin composition excellent in impact resistance can be obtained, and when the content of the graft copolymer is 50% by mass or less, a resin composition excellent in surface appearance can be obtained.

[Additives]

The thermoplastic resin composition can contain various additives as long as it does not deviate from the purpose of the present invention. Examples of the additives include stabilizers such as phenolic stabilizers, phosphorus-based stabilizers, ultraviolet absorbers, amine-based light stabilizers; phosphorus-based, bromine-based, silicone-based and organic metal salt-based flame retardants; modifier for imparting various physical properties such as the hydrolytic resistance; fillers such as titanium oxide, talc; dyes and pigments; and plasticizers.

When the thermoplastic resin is an aromatic polycarbonate resin, the additive can be used, for example the following. Flame proofing agents, antidrip agents (e.g., fluorinated polyolefins, silicones and aramid fibers), lubricants, mold release agents (e.g., pentaerythritol tetrastearate), nucleating agents, antistatic agents, stabilizers, fillers, reinforcing agents (e.g., glass fibers, carbon fibers, mica, kaolin, talc, $CaCO_3$ and glass flakes), dyes and pigments. Examples of the dyes and pigments include inorganic or organic pigments. As the inorganic pigment, iron oxide, ultramarine, titanium oxide and carbon black are mentioned. As the organic pigments, blue pigments such as phthalocyanines and anthraquinones, red pigments such as perylenes and quinacridones, and yellow pigments such as isoindolinones. Moreover, fluorescent pigments, metal powder pigments, pearl pigments and the like are exemplified as a special pigment. As dyes, nigrosines, perinones, and anthraquinones are mentioned, various grades depending on the required color are commercially available, and they can be used. These can be used singly or in combination of two or more thereof

[Preparation Method of Resin Composition]

The preparation method of the thermoplastic resin composition of the present invention is not particularly limited, the composition can be prepared by mixing and dispersing a graft copolymer, a thermoplastic resin, and various additives used as necessary by V-type blender, a Henschel mixer, and then by melt-kneading the mixture using an extruder or a kneader such as Banbury mixer, a pressure kneader and a roll. Mixing of these components can be carried out batchwise or continuously, the mixing order of each component is not particularly limited. Melt-kneaded product can be used in pelleted, for various molding.

[Molded Article]

The molded article according to the present invention is formed by molding the above thermoplastic resin composition. As a method of molding the thermoplastic resin composition, for example, it can be mentioned a method in which a thermoplastic resin composition, or a mixture of the graft copolymer powder and a thermoplastic resin is molded by an injection molding machine.

The application of the molded article is not particularly limited, and it can be widely used industrially as a material in the automotive field, the OA equipment field, the electric and electronic fields, and the like.

Examples of a resin that can be expected excellent effects by adding the polyorganosiloxane-containing graft copolymer or the graft copolymer (G1) of the present invention include crystalline resins such as PBT and PPS or POM. Although these resins are excellent in heat resistance and rigidity due to their crystallinity, toughness is insufficient. When the polyorganosiloxane-containing graft copolymer or the graft copolymer (G1) of the present invention is added in an amount of 5 to 40% by mass for the purpose of imparting toughness, a resin composition excellent in color developability, impact strength, and tensile elongation can be obtained.

In addition, other alloy resins with PC as described above may be used. When the PC/AS alloy is used to improve the fluidity of the PC or when alloys such as PC/PEs is formed to improve the chemical resistance of the PC, the impact resistance is lowered. However, when the polyorganosiloxane-containing graft copolymer or the graft copolymer (G1) of the present invention can be added in an amount of 3 to 20% by weight, the resin composition having excellent color developability and impact strength can be obtained. Further, since the polyorganosiloxane-containing graft copolymer or the graft copolymer (G1) of the present invention is excellent in thermal aging resistance, wet heat resistance and weather resistance, a resin composition obtained by adding thereof is also excellent in heat aging resistance, wet heat resistance, and weather resistance.

The impact resistance and toughness is reduced when adding a reinforcing agent such as glass filler to PC for the purpose of improving the rigidity. However, when adding the polyorganosiloxane-containing graft copolymer or the graft copolymer (G1) of the present invention in an amount of 1 to 10% by mass, a resin composition excellent in toughness together with color developability and impact strength can be obtained.

EXAMPLE

Hereinafter, the present invention will be described in detail with reference to Examples and Comparative Examples. Prior to Examples, various evaluation methods, as well, the manufacturing example 1-3 of the latex of the polyorganosiloxane will be described. Examples 1 to 3 and 13 and Comparative Examples 1, 2, 10 are examples related to the manufacture of graft copolymer and evaluation thereof, and Examples 4 to 12 and 14 and Comparative Examples 3 to 9 and 11 are examples related to the preparation of thermoplastic resins and evaluation of the composition. "Parts" and "%" in the Preparation examples and Examples, etc., means "parts by mass" and "% by mass" unless otherwise specified.

<Evaluation Method>

(1) Solid Content

The latex of polyorganosiloxane having a mass w1 is dried in a hot air dryer at 180° C. for 30 minutes, and the mass w2 of the residue after drying is measured, and the solid content [%] is calculated by the following formula.

Solid content [%]=$w2/w1\times100$ (2) Weight Average Particle Diameter (Dw)

Using a sample obtained by diluting "rubber latex" or "graft copolymer latex" with deionized water to a solid content concentration of about 3%, the particle diameter is measured and the weight average particle diameter Dw is measured using the above-mentioned condition using a CHDF2000 type particle size distributor manufactured by MATEC Corporation of the United States.

(3) Charpy Impact Strength

The Charpy impact strength of the test piece (length 80.0 mm× width 10.0 mm× thickness 4 mm, V-notched) is measured at temperatures of 23° C. and −30° C. according to the JIS K 7111.

(4) Total Light Transmittance (Color Developability)

The total light transmittance of the D65 light source is measured on a test piece (length: 100 mm, width: 50 mm, thickness: 2 mm) using a HAZE Meter NDH4000 (trade name) manufactured by Nippon Denshoku Industries Co., Ltd. in accordance with the JIS K 7375. Since the higher the total light transmittance, the higher the color developability at the time of addition of the pigment, and it is determined to be good. 3% by mass of powder of the graft copolymer is added to 97% by mass of polycarbonate resin (Mitsubishi Engineering-Plastics Corporation, trade name lupilon S-2000F, viscosity average molecular weight 24,000), the resultant mixture is melted and kneaded and then injection molded to obtain a test piece (length 100 mm, width 50 mm, thickness 2 mm). It is preferable that the total light transmittance of the test piece is 50% or more higher because the color developability when adding pigments or the like is very high.

(5) Heat Aging Resistance

A test piece (length 100 mm, width 50 mm, thickness 2 mm) is heat-treated in an oven at a temperature of 120° C. for 1000 hours. After taking out the test piece from the oven, and allowing to stand for 12 hours or more in an atmosphere at a temperature of 23° C., 50% relative humidity, and then measuring the object color by JIS Z 8729 (Display method of the object color by L*a*b* color space), the measurement is based on JIS Z 8722, using SE-4000 (trade name) manufactured by Nippon Denshoku Industries Co., Ltd. The measurements of the object color are carried out before and after heat treatment by the following "Measurement Conditions 5" to obtain color change of <$\Delta E: ((\Delta L^*)^2+(\Delta a^*)^2+(\Delta b^*)^2)^{1/2}$>.

"Measurement Conditions 5"

Device: Spectrophotometric type color difference meter SE-4000 (manufactured by Nippon Denshoku Industries Co., Ltd., a method of after-sample light splitting of 0° to Clean Copy) 45°, Measurement range: 380 nm to 780 nm, Measurement light source: C light (2° field of view).

(6) Moist Heat Resistance

The test piece (length: 100 mm, width: 50 mm, thickness: 2 mm) is subjected to a moist-heat treatment in a thermos-hygrostat at a temperature of 85° C. and a humidity of 85% for 1000 hours. After taking out the test piece from the thermos-hygrostat and allowing to stand for 12 hours or more in an atmosphere at a temperature of 23° C., 50% relative humidity, and then measuring the object color by JIS Z 8729 (Display method of the object color by L*a*b* color space), the measurement is based on JIS Z 8722, using SE-4000 (trade name) manufactured by Nippon Denshoku Industries Co., Ltd. The measurements of the object color are carried out before and after heat treatment by the afore-mentioned "Measurement Conditions 5" to obtain color change of $<\Delta E: ((\Delta L^*)^2+(\Delta a^*)^2+(\Delta b^*)^2)^{1/2}>$.

(7) Weather Resistance

The test piece (length: 100 mm, width: 50 mm, thickness: 2 mm) is exposed to a sunshine weather meter (manufactured by Suga Test Instruments Co, Ltd., model: WEL-SUN-HCH-B) for 500 hours under the conditions of a black panel temperature: 63° C. and rain. After taking out the test piece from the thermos-hygrostat and allowing to stand for 12 hours or more in an atmosphere at a temperature of 23° C., 50% relative humidity, and then measuring the object color by JIS Z 8729 (Display method of the object color by L*a*b* color space), the measurement is based on JIS Z 8722, using SE-4000 (trade name) manufactured by Nippon Denshoku Industries Co., Ltd. The measurements of the object color are carried out before and after heat treatment by the afore-mentioned "Measurement Conditions 5" to obtain color change of $<\Delta E: ((\Delta L^*)^2+(\Delta a^*)^2+(\Delta b^*)^2)^{1/2}>$.

(8) Refractive Index of the Polyorganosiloxane-Containing Graft Copolymer

The polyorganosiloxane-containing graft copolymer thinned by compression molding is measured for refractive index according to JIS K 7142 A method, using an Abbe refractometer at a temperature 23° C.

(9) Jet-Blackness (Pigmentation)

Test piece 2 with a thickness of 2 mm colored with a carbon black is measured for the object color by JIS Z 8729 (Display method of the object color by L*a*b* color space), the measurement is based on JIS Z 8722, using SE-4000 (trade name) manufactured by Nippon Denshoku Industries Co., Ltd. The measurements of the object color are carried out in accordance with the following "Measurement Condition 25", and the L* is to be the index of a jet-blackness. Lower L * is more excellent jet-blackness, indicating that color developability upon addition of pigment is excellent.
"Measurement Condition 25"
Device: Spectrophotometric type color difference meter SE-4000 (manufactured by Nippon Denshoku Industries Co., Ltd., a method of after-sample light splitting of 0° to) 45°,
Measurement range: 380 to 780 nm,
Measurement light source: C light (2° field of view).

(10) Flame Retardancy

A UL-94V test (vertical test method) was performed on 1/16-in. test pieces (length: 127 mm, width: 12.7 mm, thickness: 1.6 mm).

Production Example 1

2 parts of tetraethoxysilane (TEOS), 2 parts of γ-methacryloyloxy propyl dimethoxy methyl silane (DSMA), and 96 parts of octamethylcyclotetrasiloxane (made by Momentive Performance Materials Japan Inc., trade name: TSF404) were mixed to obtain 100 parts of an organosiloxane mixture. An aqueous solution formed by dissolving 1 part of sodium dodecylbenzene sulfonate (DBSNa) in 150 parts of deionized water was added in the mixture, and a stable preparatory mixed emulsion was obtained by stirring using a homomixer at 10,000 rpm for 5 minutes and then passing the mixture through a homogenizer at a pressure of 20 MPa twice.

Then, after the above emulsion was added in a separable flask having a volume of 5 L and provided with a cooling condenser, the emulsion was heated to a temperature of 80° C., and then a mixture of 0.20 parts of sulfuric acid and 49.8 parts of distilled water was continuously added over 3 minutes. After the temperature was kept at 80° C. for 7 hours to perform polymerization reaction, the mixture was cooled to 25° C., and the resulting reactant was kept at 25° C. for 6 hours. Then, a 5% aqueous solution of sodium hydroxide was added to neutralize the reaction solution to a pH of 7.0 to obtain a polyorganosiloxane latex (AS-1).

Solid content of the polyorganosiloxane latex (AS-1) was 29.8%. The number average particle diameter measured by a capillary size distribution analyzer of this latex (Dn) is 384 nm, the weight average particle diameter (Dw) is 403 nm, Dw/Dn was 1.05.

Production Example 2

Except for changing the tetraethoxysilane (TEOS) in 0.5 parts from 2 parts, the procedure of Production Example 1 was repeated to obtain polyorganosiloxane latex (AS-2).

Solid content of the polyorganosiloxane latex (AS-2) was 29.2%. The number average particle diameter measured by a capillary size distribution analyzer of this latex (Dn) is 399 nm, the weight average particle diameter (Dw) is 407 nm, Dw/Dn was 1.02.

Production Example 3 Production of Polyorganosiloxane Latex (AS-3)

1.5 parts of tetraethoxysilane (TEOS), 1 part of γ-methacryloyloxy propyl dimethoxy methyl silane (DSMA), 87.5 parts of a cyclic dimethylsiloxane mixture (manufactured by Shin-Etsu Silicone Co., Ltd., product name: DMC), and 10 parts of diphenyldimethoxysilane (manufactured by Shin-Etsu silicone Co., Ltd., product name: KBM-202SS) were mixed to obtain 100 parts of an organosiloxane mixture. An aqueous solution formed by dissolving 0.67 parts of sodium dodecylbenzenesulfonate (DBSNa) in 200 parts of deionized water was added in the mixture, and a stable preparatory mixed emulsion was obtained by stirring using a homomixer at 10,000 rpm for 5 minutes and then passing the mixture through a homogenizer at a pressure of 20 MPa twice.

Then, after the above emulsion was added in a separable flask having a volume of 5 L and provided with a cooling condenser, the emulsion was heated to a temperature of 80° C., and then a mixture of 0.67 parts of dodecylbenzenesulfonic acid and 20 parts of deionized water was continuously charged over 2 hours. the temperature was kept at 80° C. for 4 hours to perform polymerization reaction, the mixture was cooled to 25° C., and the resulting reactant was kept at 25° C. for 6 hours. Then, a 5% aqueous solution of sodium hydroxide was added to neutralize the reaction solution to a pH of 7.0 to obtain a polyorganosiloxane latex (AS-3). Solid content of the latex was 27.3%. The number average particle diameter measured by a capillary size distribution analyzer of this latex (Dn) is 214 nm, the weight average particle diameter (Dw) is 142 nm, Dw/Dn was 1.51.

Example 1

67.11 parts (20.0 parts in terms of polymer) of the polyorganosiloxane latex (AS-1) obtained in Production Example 1 was placed in a separable flask having a volume of 5 L, and then 160 parts of deionized water was added to mix. Next, in this separable flask, a mixture (¼ amounts of the mixture used in rubber polymerization) of 17.25 parts of styrene (St), 0.44 parts of allyl methacrylate (AMA), and 0.07 parts of cumene hydroperoxide (CHP) was added, and then the mixture was continuously stirred at 25° C. for 1 hour to impregnate the mixture in polyorganosiloxane.

Nitrogen gas substitution was performed on the atmosphere in the separable flask by feeding nitrogen gas through the flask until the liquid temperature was increased to 70° C. An aqueous solution formed by dissolving 0.001 parts of ferrous (Fe) sulfate, 0.003 parts of ethylenediamine tetraacetic acid disodium salt (EDTA), and 0.24 parts of sodium formaldehyde sulfoxylate (SFS) in 10 parts of deionized water was added at the time point at which the liquid temperature was 70° C. to begin radical polymerization. After 30 minutes from starting the radical polymerization, an aqueous solution of 51.75 parts of styrene (St), 1.33 parts of allyl methacrylate (AMA), 0.21 parts of cumene hydroperoxide (CHP), and 2.53 parts (0.38 parts in terms of solid content) of sodium dodecylbenzenesulfonate (trade name: Neopelex G-15, solid content: 15%) dissolved in 26.74 parts of deionized water was mixed, the mixed emulsion, which was obtained by dispersing the mixture using ULTRA-TURRAX® T25 (IKA Co.), for 2 minutes at a rotational speed of 10000 rpm, was added dropwise over 330 minutes to the aqueous solution.

In order to complete the polymerization of the vinyl monomer components, the resultant was maintained the state of 70° C. for 1 hour after the completion of the dropwise addition to obtain a latex of a rubber (A-1) containing a polyorganosiloxane and styrene.

A mixed solution of 9.5 parts of methyl methacrylate (MMA), 0.5 parts of butyl acrylate (BA), and 0.05 parts of t-butyl hydroperoxide (t-BH) was dropped into the latex for 1 hour at a liquid temperature of 70° C. to initiate and continue the graft polymerization. After completion of the dropwise addition, the state of the temperature of 70° C. was kept for 1 hour and then cooled to 25° C. to obtain a latex of a polyorganosiloxane-containing graft copolymer (G-1).

Next, 500 parts of an aqueous solution containing calcium acetate at a concentration of 1% by mass was heated to 85° C., and 340 parts of the latex of the graft copolymer (G-1) was gradually dropped and coagulated into the aqueous solution while stirring. The resulting graft copolymer (G-1) was filtered, washed, dehydrated, and dried to obtain a powder of the graft copolymer (G-1). The polymerization rate and the weight average particle diameter of the graft copolymer (G-1) is shown in Table 1. Further, tan δ measured by the Measuring Condition 1 is also shown in Table 1. Note that the polymerization rate is a polymerization rate of the monomer components used in the whole process from manufacture of composite rubber to graft polymerization.

Examples 2 and 3, Comparative Examples 1 and 2

Polyorganosiloxane-containing graft copolymers (G-2, G-3, and G'-1, G'-2) were produced in the same manner as in Example 1 except that the kinds and amounts of the raw materials used in Example 1 were changed to the conditions shown in Table 1, and powders of the graft copolymers were further obtained. The polymerization rate and the weight average particle diameter of each of the obtained graft copolymers are shown in Table 1. The peak temperature of tan δ measured under the Measurement Condition 1 is also shown in Table 1. The numerical values in parentheses in the columns of the monofunctional vinyl monomer (a1) and the polyfunctional vinyl monomer (a2) in Table 1 indicate the composition ratio (% by mass) thereof in 100% by mass of the vinyl polymer (A2). The refractive index calculated from the composition and the refractive index measured by Abbe refractometer are also shown in Table 1.

TABLE 1

| | | | | Example | | | Comparative Example | |
|---|---|---|---|---|---|---|---|---|
| | | | | 1 | 2 | 3 | 1 | 2 |
| | Graft copolymer | | | G-1 | G-2 | G-3 | G'-1 | G'-2 |
| Rubber (A) part | Polyorganosiloxane (A1) (Solids) | Kind | | AS-1 | AS-1 | AS-2 | AS-1 | AS-1 |
| | | Amount [part] | | 20 | 30 | 20 | 30 | 30 |
| | Vinyl polymer (A2) | Monomer (a1) | St part (%) | 69 (97.5) | 59 (97.5) | 69 (97.5) | 39 (97.5) | 39 (97.5) |
| | | Monomer (a2) | AMA part (%) | 1.77 (2.5) | 1.51 (2.5) | 1.77 (2.5) | 1.00 (2.5) | 1.00 (2.5) |
| | Weight average particle diameter (Dw) | [nm] | | 492 | 479 | 506 | 452 | 457 |
| Graft part | Vinyl monomer (b) [part] | MMA | | 9.5 | 9.5 | 9.5 | 28.5 | — |
| | | BA | | 0.5 | 0.5 | 0.5 | — | — |
| | | PhMA | | — | — | — | — | 28.5 |
| | | MA | | — | — | — | 1.5 | 1.5 |
| Refractive index of the graft copolymer | (Calc.) | [—] | | 1.544 | 1.527 | 1.544 | 1.507 | 1.530 |
| | (Found) | [—] | | 1.542 | 1.525 | 1.542 | 1.502 | 1.522 |
| Polymerization rate of the graft copolymer | | (%) | | 99 | 99 | 99 | 99 | 99 |
| Weight average particle diameter of the graft copolymer | | [nm] | | 511 | 490 | 522 | 494 | 486 |
| Peak temperature of tan δ of the graft copolymer | | [° C.] | | −122 | −122 | −118 | −126 | −127 |
| | | | | −64 | −70 | −61 | — | — |
| | | | | 119 | 116 | 120 | 121 | 121 |

Abbreviations in Table 1 are as follows.
St: Styrene
BA: n-butyl acrylate
AMA: allyl methacrylate
MMA: methyl methacrylate
PhMA: phenyl methacrylate
MA: methyl acrylate In Comparative Examples 3-4, the peak temperature of tan δ of the polyorganosiloxane-containing copolymer was not within range of −125° C. to −90° C., the balance between the low temperature impact strength and the total light transmittance was low. In addition, it was particularly inferior in the weather resistance.

TABLE 2

|  |  |  | Example | | | Comparative Example | | |
|---|---|---|---|---|---|---|---|---|
|  |  |  | 4 | 5 | 6 | 3 | 4 | 5 |
| Thermoplastic resin composition | | | H-1 | H-2 | H-3 | H-4 | H-5 | H-6 |
| Graft copolymer | Kind | | G-1 | G-2 | G-3 | G'-1 | G'-2 | — |
|  | Amount [part] | | 3 | 3 | 3 | 3 | 3 | — |
| PC | part | | 97 | 97 | 97 | 97 | 97 | 100 |
| Charpy impact strength | [kJ/m$^2$] | 23° C. | 74.2 | 73.5 | 73.3 | 72.1 | 72.5 | 80.8 |
|  |  | −30° C. | 29.6 | 34.2 | 32.7 | 33.0 | 30.6 | 13.4 |
| Total light transmittance | (%) | | 58.9 | 53.3 | 60.1 | 49.6 | 53.3 | 89.9 |
| Heat aging resistance | ΔE | (—) | 2.1 | 2.2 | 2.1 | 1.8 | 4.2 | 0.5 |
| Moist-heat resistance |  |  | 0.5 | 0.6 | 0.4 | 0.6 | 2.1 | 0.1 |
| Weather resistance |  |  | 13.2 | 14.5 | 13.3 | 16.1 | 17.2 | 3.6 |

In addition, the calculated value of the refractive index of the graft copolymer is close to the found values, and thus it is understood that a graft copolymer having the desired refractive index can be easily obtained by adjusting the composition.

Examples 4-6, Comparative Examples 3-5

Each of powders of polyorganosiloxane-containing graft copolymers (G-1) to (G-3), (G'-1) and (G'-2) and a polycarbonate resin (abbreviation "PC", manufactured by Mitsubishi Engineering-Plastics Corporation, trade name; lupilon S-2000F, viscosity-average molecular weight 24,000) were blended and mixed in the proportions described in Table 2. The blend was supplied to a 30 mmφ twin screw extruder (L/D=30), melt-mixed at a cylinder temperature of 280° C. and a screw rotation speed of 150 rpm, and extruded, and each pellet of the thermoplastic resin compositions (H-1) to (H-6) was obtained.

The resulting pellet was dried for 12 hours at 70° C., and then supplied to a 100-ton injection molding machine (Sumitomo Heavy Industries Ltd., trade name; SE-100DU), and injection molding was performed at a cylinder temperature of 280° C. and a mold temperature of 80° C. to obtain "test piece 1" (length 80 mm, width 10 mm, thickness 4 mm, V notched) and "test piece 2" (length 100 mm, width 50 mm, thickness 2 mm). Next, Charpy impact strength, total light transmittance (color developability), heat aging resistance, moist-heat resistance, and weather resistance were measured using each test piece. The evaluation results are shown in Table 2.

[Performance Comparison of the Resin Composition]

Examples 4 to 6 containing a polyorganosiloxane-containing copolymer having a peak temperature of tan δ in the range of −125° C. to −90° C. were excellent in balancing the low temperature impact strength and the total light transmittance. Heat aging resistance, moist-heat resistance and weather resistance were excellent with good balance in comparison with Comparative Examples 3 and 4.

Examples 7-9, Comparative Example 6

Each of Powders of polyorganosiloxane-containing graft copolymers (G-1) to (G-3), (G'-1) and (G'-2), a polycarbonate resin (abbreviation "PC", manufactured by Mitsubishi Engineering-Plastics Corporation, trade name; lupilon S-2000F, viscosity-average molecular weight 24,000), and carbon black #960 (abbreviated as "CB", manufactured by Mitsubishi Chemical Corporation) as a colorant were blended and mixed in the proportions described in Table 3. The blend was supplied to a 30 mmφ twin screw extruder (L/D=30), melt-mixed at a cylinder temperature of 280° C. and a screw rotation speed of 150 rpm, and extruded, and each pellet of the thermoplastic resin compositions (H-7) to (H-10) was obtained.

The resulting pellet was dried for 12 hours at 70° C., and then supplied to a 100-ton injection molding machine (Sumitomo Heavy Industries Ltd., trade name; SE-100DU), and injection molding was performed at a cylinder temperature of 280° C. and a mold temperature of 80° C. to obtain "test piece 2" (length 100 mm, width 50 mm, thickness 2 mm). Then, it was to evaluate the jet-blackness. The evaluation results are shown in Table 3.

Examples 7-8 were excellent in jet-blackness compared to Comparative Example 6.

TABLE 3

|  |  | Example | | | Comp. Ex. |
|---|---|---|---|---|---|
|  |  | 7 | 8 | 9 | 6 |
| Thermoplastic resin composition | | H-7 | H-8 | H-9 | H-10 |
| Graft copolymer | Kind | G-1 | G-2 | G-3 | G'-1 |
|  | Amount [part] | 3 | 3 | 3 | 3 |
| PC | part | 97 | 97 | 97 | 97 |

TABLE 3-continued

|  |  | Example | | | Comp. Ex. |
|---|---|---|---|---|---|
|  |  | 7 | 8 | 9 | 6 |
| CB | part | 0.1 | 0.1 | 0.1 | 0.1 |
| Jet-blackness | L*(—) | 2.7 | 3.5 | 2.8 | 4.8 |

Examples 10-12, Comparative Examples 7-9

Each powder of polyorganosiloxane-containing graft copolymers (G-1) to (G-3), (G'-1) and (G'-2), a polycarbonate resin (abbreviated as "PC", Mitsubishi Engineering-Plastics Corporation, trade name: lupilon S-2000F, viscosity average molecular weight of 24,000), an aromatic phosphoric acid ester-based flame retardant (manufactured by Daihachi Chemical Industry Co., Ltd., trade name: PX-200), and a polytetrafluoroethylene-containing powder (abbreviated "PTFE", Mitsubishi Chemical Corporation, trade name; METABLEN A-3800) were blended and mixed in the proportions described in Table 4. The blend was supplied to a 30 mmφ twin screw extruder (L/D=30), melt-mixed at a cylinder temperature of 280° C. and a screw rotation speed of 150 rpm, and extruded, and each pellet of the thermoplastic resin compositions (H-11) to (H-16) was obtained.

The resulting pellet was dried for 12 hours at 70° C., and then supplied to a 100-ton injection molding machine (Sumitomo Heavy Industries Ltd., trade name; SE-100DU), and injection molding was performed at a cylinder temperature of 280° C. and a mold temperature of 80° C. to obtain "test piece 1" (length 80 mm, width 10 mm, thickness 4 mm, V notched), "test piece 2" (length 100 mm, width 50 mm, thickness 2 mm) and "test piece 3" (length 127 mm, width 12.7 mm, thickness 1.6 mm). Next, Charpy impact strength, total light transmittance, and flame retardancy were measured using each test piece. The evaluation results are shown in Table 4.

Examples 10-12 are excellent in balance of the Charpy impact strength at low temperatures, the total light transmittance, and flame retardancy in comparison with Comparative Examples 7-9.

The following are examples of the second aspect of the invention.

Example 13

67.11 parts (20.0 parts in terms of polymer) of the polyorganosiloxane latex (AS-1) obtained in Production Example 1 was placed in a separable flask having a volume of 5 L, and then 160 parts of deionized water was added to mix. Next, in this separable flask, a mixture (¼ amounts of the mixture used in rubber polymerization) of 12.25 parts of styrene (St), 5.00 parts of n-butyl acrylate (BA), 0.44 parts of allyl methacrylate (AMA), 0.07 parts of cumene hydroperoxide (CHP) was added, and then the mixture was continuously stirred at 25° C. for 1 hour to impregnate the mixture in polyorganosiloxane.

Nitrogen gas substitution was performed on the atmosphere in the separable flask by feeding nitrogen gas through the flask, and the liquid temperature was raised to 70° C. An aqueous solution in which 0.001 parts of ferrous (Fe) sulfate, 0.003 parts of ethylenediamine tetraacetic acid disodium salt (EDTA), and 0.24 parts of sodium formaldehyde sulfoxylate (SFS) were dissolved in 10 parts of deionized water was added at the time point at which the liquid temperature was 70° C. to begin radical polymerization. After 30 minutes from starting the radical polymerization, an aqueous solution of 36.75 parts of styrene (St), 15.00 parts of n-butyl acrylate (BA), 1.33 parts of allyl methacrylate (AMA), 0.21 parts of cumene hydroperoxide (CHP), and 2.53 parts (0.38 parts in terms of solid content) of sodium dodecylbenzenesulfonate (trade name: Neopelex G-15, solid content: 15%) dissolved in 26.74 parts of deionized water was mixed, the mixed emulsion, which was obtained by dispersing the mixture using ULTRA-TURRAX® T25 (IKA Co.), for 2 minutes at a rotational speed of 10000 rpm, was added dropwise over 330 minutes to the aqueous solution.

In order to complete the polymerization of the vinyl monomer component, the resultant was maintained the state of 70° C. for 1 hour after the completion of the dropwise addition to obtain a latex of a rubber containing a polyorganosiloxane and styrene.

A mixed solution of 9.5 parts of methyl methacrylate (MMA), 0.5 parts of butyl acrylate (BA), and 0.05 parts of t-butyl hydroperoxide (t-BH) was dropped into the latex for

TABLE 4

|  |  |  | Example | | | Comparative Example | | |
|---|---|---|---|---|---|---|---|---|
|  |  |  | 10 | 11 | 12 | 7 | 8 | 9 |
| Thermoplastic resin composition | | | H-11 | H-12 | H-13 | H-14 | H-15 | H-16 |
| Graft copolymer | Kind | | G-1 | G-2 | G-3 | G'-1 | G'-2 | — |
|  | Amount [part] | | 5 | 5 | 5 | 5 | 5 | — |
| PC | part | | 95 | 95 | 95 | 95 | 95 | 100 |
| Flame retardant | part | | 4 | 4 | 4 | 4 | 4 | 4 |
| PTFE | part | | 0.5 | 0.5 | 0.5 | 0.5 | 0.5 | 0.5 |
| Charpy impact strength | [kJ/m$^2$] | 23° C. | 72.2 | 70.3 | 68.9 | 71.3 | 71.1 | 9.9 |
|  |  | −30° C. | 19.5 | 23.9 | 22.9 | 20.2 | 19.3 | 8.4 |
| Total light transmittance | (%) | | 52.9 | 46.6 | 53.7 | 41.8 | 46.8 | 70.4 |
| Flame retardancy | UL grade | | V0 | V0 | V0 | V0 | V0 | V0 |
|  | Total combustion time | (second) | 9 | 19 | 19 | 25 | 22 | 35 |

1 hour at a liquid temperature of 70° C. to initiate and continue the graft polymerization. After completion of the dropwise addition, the state of the temperature of 70° C. was kept for 1 hour and then cooled to 25° C. to obtain a latex of a polyorganosiloxane-containing graft copolymer (G-4).

Next, 500 parts of an aqueous solution containing calcium acetate at a concentration of 1% by mass was heated to 85° C., and 340 parts of the latex of the graft copolymer (G-4) was gradually dropped and coagulated into the aqueous solution while stirring. The resulting graft copolymer (G-4) was filtered, washed, dehydrated, and dried to obtain a powder of the graft copolymer (G-4). The polymerization rate and the weight average particle diameter of the graft copolymer (G-4) is shown in Table 5. Note that the polymerization rate is a polymerization rate of the monomer components used in the whole process from manufacture of composite rubber to graft polymerization.

Comparative Example 10

73.3 parts (20 parts in terms of polymer) of the polyorganosiloxane latex (AS-3) obtained in Production Example 3 was placed in 5-liter separable flask, and 160 parts of deionized water and 0.7 parts of DBSNa were added and mixed. Next, 8 parts of styrene (St) was added into the separable flask, and the mixture was stirred at 25° C. for 1 hour and impregnated with polyorganosiloxane.

The atmosphere in the flask was replaced with nitrogen by feeding a nitrogen gas through the separable flask, and the liquid temperature was raised to 75° C. When the liquid temperature reached 75° C., an aqueous solution in which 0.09 part of potassium persulfate (KPS) was dissolved in 5 parts of deionized water was added to initiate radical polymerization. In order to complete the polymerization of styrene, the state at 75° C. was maintained for 2 hours after the addition of KPS.

Next, the liquid temperature of this latex was lowered to 25° C., a mixture of 41 parts of n-butyl acrylate (BA) and 2 parts of triallyl cyanurate (TAC) was added thereto, and the stirring was continued for 1 hour at 25° C. to impregnate the monomer mixture in the polyorganosiloxane.

Then, the liquid temperature of this latex was raised to 75° C. When the liquid temperature reached 75° C., an aqueous solution in which 0.09 part of potassium persulfate (KPS) was dissolved in 5 parts of deionized water was added to initiate radical polymerization. In order to complete the polymerization of styrene, the state at 75° C. was maintained for 2 hours after the addition of KPS to obtain a latex of a rubber containing a polyorganosiloxane and styrene.

In the state of which the liquid temperature of this latex was 75° C., an aqueous solution in which 0.15 part of KPS was dissolved in 5 parts of deionized water was added, then 29 parts of St was added dropwise to the latex for 15 minutes to initiate and continue the graft polymerization reaction. After completion of the dropwise addition, the state of the temperature of 75° C. was kept for 4 hours and then cooled to 25° C. to obtain a latex of a polyorganosiloxane-containing graft copolymer (G'-3).

Next, 500 parts of an aqueous solution containing calcium acetate at a concentration of 1% by mass was heated to 60° C., and 328.3 parts of the latex of the graft copolymer (G'-3) was gradually dropped and coagulated into the aqueous solution while stirring. The resulting graft copolymer (G'-3) was filtered, washed, dehydrated, and dried to obtain a powder of the graft copolymer (G'-3). The polymerization rate and the weight average particle diameter of the graft copolymer (G'-3) is shown in Table 5. Note that the polymerization rate is a polymerization rate of the monomer components used in the whole process from manufacture of composite rubber to graft polymerization.

Abbreviations in Table 5 are as follows.
St: Styrene
BA: n-Butyl acrylate
AMA: Allyl methacrylate
TAC: Triallyl cyanurate
MMA: Methyl methacrylate

TABLE 5

| | | | | Example 13 | Comparative Example 10 |
|---|---|---|---|---|---|
| | Graft copolymer | | | G-4 | G'-3 |
| Rubber part | Polyorganosiloxane (Solids) | | Kind | AS-1 | AS-3 |
| | | | Amount [part] | 20 | 20 |
| | Vinyl polymer | Vinyl monomer [part] | St | 49 | 8 |
| | | | BA | 20 | 41 |
| | | Polyfunctional vinyl monomer [part] | AMA | 1.77 | — |
| | | | TAC | — | 2.00 |
| | Weight average particle diameter of the rubber part | | [nm] | 485 | 249 |
| Graft part | Vinyl monomer [part] | | MMA | 9.5 | — |
| | | | BA | 0.5 | — |
| | | | St | — | 29 |
| Polymerization rate of the graft copolymer | | | (%) | 99 | 99 |
| Weight average particle diameter of the graft copolymer | | | [nm] | 505 | 272 |

With regard to the above graft copolymers G-4 and G'-3 and the graft copolymers G-3 and G'-1 prepared in Example 3 and Comparative Example 1, the following measurements were performed to evaluate the dispersed phase and the continuous phase in the graft copolymers. The results are shown in Table 6.

(11) Elastic Modulus of the Graft Copolymer

"Measurement Condition 3"

The particles of the graft copolymer are taken up in a capsule, the room temperature curing epoxy resin is poured, the capsule is left to cure for 12 hours at 25° C., and the obtained resin pieces are used as Sample 1 by ultramicrotome (trade name "Leica EM UC7", manufactured by Leica Microsystems Co., Ltd.) and exposed at room temperature using a glass knife. Sample 1 is subjected to scanning probe microscopy (manufactured by Veeco Instruments, Inc.) to acquire an elastic modulus image of the particles in a scanning area of 1 μm square.

In the elastic modulus image of the particle, a histogram of the elastic modulus of a rectangular region inscribed in the particle is obtained, the peak top of the Gaussian curve of the histogram is defined as the elastic modulus of the phase B. A histogram of the elastic modulus is also obtained in a region having a size of 50 nm square or more included in a region having an elastic modulus of 0.20 GPa or more in the particle, and the peak top of the Gaussian curve of the histogram is defined as the elastic modulus of the phase A.

(12) Diameter of High Modulus Phase in the Graft Copolymer

"Measurement Condition 4"

The resin piece obtained by the Measurement Condition 3 is exposed and trimmed by the above ultramicrotome using a diamond knife at room temperature, and a slice is cut out under the condition of a thickness of 50 nm, and collected on a grid with a support film to use sample 2. Sample 2 is placed on a transmission electron microscope (trade name: "H-7600", Hitachi Co., Ltd.), to obtain a particle image at an acceleration voltage of 80 kV, a magnification of 200,000×. The obtained particle images are subjected to flatten the background brightness unevenness, remove noises, enhance edges, and binarize using image analysis software (trade name "Image-Pro® Plus", Nippon Roper K. K.). In the obtained particle image, a phase that appeared to be bright contrast is extracted by binarization, and 10 points are selected in order from the phases with the largest diameter that can be visually recognized in one particle image, and the average diameter thereof is obtained. Further, an average value is obtained for the average diameters of 10 particles, and the average value is defined as the average diameter of the A phase.

TABLE 6

|      | Dispersed phase || Continuous phase |
| --- | --- | --- | --- |
|      | Elastic modulus [GPa] | Diameter [nm] | Elastic modulus [GPa] |
| G-3  | 0.47 | 89 | 0.17 |
| G-4  | 0.45 | 60 | 0.05 |
| G'-1 | 0.47 | 46 | 0.17 |
| G'-3 | 0.23 | 26 | 0.04 |

Example 14, Comparative Example 11

Each of powders of graft copolymers (G-4) and (G'-3), and a polycarbonate resin (Mitsubishi Engineering-Plastics Corporation, trade name: Iupilon S-2000F, a viscosity-average molecular weight of 24,000) were blended and mixed in the proportions described in Table 7. The blend was supplied to a 30 mmϕ twin screw extruder (L/D=30), melt-mixed at a cylinder temperature of 280° C. and a screw rotation speed of 150 rpm, and extruded, and each pellet of the thermoplastic resin compositions (H-17) and (H-18).

The resulting pellet was dried for 12 hours at 70° C., and then supplied to a 100-ton injection molding machine (Sumitomo Heavy Industries Ltd., trade name; SE-100DU), and injection molding was performed at a cylinder temperature of 280° C. and a mold temperature of 80° C. to obtain "test piece 1" (length 80 mm, width 10 mm, thickness 4 mm, V notched) and "test piece 2" (length 100 mm, width 50 mm, thickness 2 mm). Next, Charpy impact strength and total light transmittance (color developability) were measured using each test piece. The evaluation results are shown in Table 7. Note that, Table 7 also shows the results of Example 6 using the graft copolymer (G-3) included in the first embodiment of the invention, Comparative Example 3 using the graft copolymer (G'-1) and Comparative Example 5 using no graft copolymer.

TABLE 7

|  |  |  | Example || Comparative Example |||
| --- | --- | --- | --- | --- | --- | --- | --- |
|  |  |  | 6 | 14 | 3 | 11 | 5 |
| Thermoplastic resin composition ||| H-3 | H-17 | H-4 | H-18 | H-6 |
| Graft | Kind |  | G-3 | G-4 | G'-1 | G'-3 | — |
| copolymer | Amount | [part] | 3 | 3 | 3 | 3 | — |
| PC | part |  | 97 | 97 | 97 | 97 | 100 |
| Charpy impact strength | [kJ/m²] | 23° C. | 73.3 | 70.1 | 72.1 | 69.2 | 80.8 |
|  |  | −30° C. | 32.7 | 34.3 | 33.0 | 23.6 | 13.4 |
| Total light transmittance | (%) |  | 60.1 | 53.2 | 49.6 | 38.2 | 89.9 |

The resin composition including a graft copolymer, in which a phase (A phase) having 0.4 GPa or more of elastic modulus and another phase (B phase) having 0.2 GPa or less of elastic modulus are included, the A phase is a dispersed phase, the B phase is a continuous phase, and the size of the A phase is 50 nm or more, was excellent in balance between Charpy impact strength at low temperatures and the total light transmittance (color developability).

INDUSTRIAL APPLICABILITY

The polyorganosiloxane-containing graft copolymer and graft copolymer (G1) of the present invention can provide a thermoplastic resin composition and a molded article, excellent in balance between the impact strength at low temperatures and color developability by adding to the thermoplastic resin as an impact strength modifier. The resulting molded article can be widely used industrially as materials in the automotive field, the OA equipment field, the electric and electronic fields, and the like.

This application claims priority based on Japanese Patent Application No. 2017-111777 filed on Jun. 6, 2017, the entire disclosure of which is incorporated herein.

Although the invention has been described with reference to embodiments and examples, the present invention is not limited to the above embodiments and examples. Various changes that can be understood by those skilled in the art can be made to the configuration and details of the present invention within the scope of the present invention.

DESCRIPTION OF SYMBOLS

1 Graft copolymer particles
2 Dispersed phase (A phase)
3 Continuous phase (B phase)
4 Hardened layer of epoxy resin

The invention claimed is:

1. A graft copolymer having a dispersed phase comprising an aromatic vinyl polymer (A phase) and a continuous phase comprising a polyorganosiloxane (B phase) wherein, in an elastic modulus image measured in Measurement Condition 3, an elastic modulus in the A phase is 0.4 GPa or more, and an elastic modulus in the B phase is 0.2 GPa or less, and
   wherein an average diameter of the A phase measured in Measurement Condition 4 is 50 nm or more:

Measurement Condition 3 includes the following:
particles of the graft copolymer are taken up in a capsule, a room temperature curing epoxy resin is poured into the capsule, the capsule and cured for 12 hours at 25° C., and obtained resin pieces are used as Sample 1 by ultramicrotome and exposed at room temperature using a glass knife;

sample 1 is subjected to scanning probe microscopy to acquire an elastic modulus image of the particles in a scanning area of 1 μm square:

in the elastic modulus image of the particles, a first histogram of the elastic modulus of a rectangular region inscribed in the particle is obtained, a peak top of a Gaussian curve of the first histogram is defined as the elastic modulus of the phase B; and a second histogram of the elastic modulus is also obtained in a region having a size of 50 nm square or more included in a region having an elastic modulus of 0.20 GPa or more in the particle, and a peak top of a Gaussian curve of the second histogram is defined as the elastic modulus of the phase A, Measurement Condition 4 includes the following:
the resin piece obtained by the Measurement Condition 3 is exposed and trimmed by the above ultramicrotome using a diamond knife at room temperature, and a slice is cut out under the condition of a thickness of 50 nm, and collected on a grid with a support film to use as sample 2;

sample 2 is placed on a transmission electron microscope, to obtain a particle image at an acceleration voltage of 80 kV, a magnification of 200,000×;

the obtained particle image is subjected to flatten a background brightness unevenness, remove noises, enhance edges, and binarize using image analysis software;

in the obtained particle image, a phase of bright contrast is extracted by binarization, and 10 points are selected in order from the phases with the largest diameter in one particle image, and the average diameter thereof is obtained; and further, an average value is obtained for the average diameters of 10 particles, and the average value is defined as the average diameter of the A phase.

2. The graft copolymer according to claim 1, wherein two or more of the A phase are included in one particle of the graft copolymer.

3. The graft copolymer according to claim 1, wherein the average diameter of the A phase is 60 nm or more.

4. The graft copolymer according to claim 1, wherein the graft copolymer has a weight average particle diameter of 300 to 2000 nm.

5. The graft copolymer according to claim 1, wherein the graft copolymer is a polyorganosiloxane-containing graft copolymer in which a rubber (A) containing a polyorganosiloxane (A1) and a vinyl polymer (A2) is grafted with a vinyl monomer (b), wherein, the contents of the polyorganosiloxane (A1) and the vinyl polymer (A2) are 0.1 to 40% by mass of the polyorganosiloxane (A1) and 41 to 99.9% by mass of the vinyl polymer (A2) with respect to 100% by mass of the polyorganosiloxane-containing graft copolymer.

6. The graft copolymer according to claim 5, wherein a content of the rubber (A) in the graft copolymer is 10.0 to 99.9% by mass relative to 100% by mass of the graft copolymer.

7. The graft copolymer according to claim 5, wherein a content of the rubber (A) in the graft copolymer is 50.0 to 99.9% by mass relative to 100% by mass of the graft copolymer.

8. The graft copolymer according to claim 5, wherein a content of the rubber (A) in the graft copolymer is 81.0 to 99.9% by mass relative to 100% by mass of the graft copolymer.

9. The graft copolymer according to claim 1, wherein the aromatic vinyl polymer comprises a homo or copolymer of styrene and a substituted styrene selected from the group consisting of p-methylstyrene, m-methylstyrene, o-methylstyrene, o-t-butylstyrene, m-t-butylstyrene, p-t-butylstyrene, p-chlorostyrene, o-chlorostyrene, a-methylstyrene, and vinyl toluene.

* * * * *